United States Patent
Klinkner et al.

(10) Patent No.: US 10,911,904 B1
(45) Date of Patent: *Feb. 2, 2021

(54) TRACKING DEVICE PRESENCE DETECTION AND REPORTING BY ACCESS POINTS

(71) Applicant: Tile, Inc., San Mateo, CA (US)

(72) Inventors: Steven R. Klinkner, Palo Alto, CA (US); Josselin de la Broise, Mountain View, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,447

(22) Filed: Sep. 15, 2020

Related U.S. Application Data

(63) Continuation of application No. 16/892,165, filed on Jun. 3, 2020, which is a continuation of application No. 16/530,835, filed on Aug. 2, 2019, now Pat. No. 10,708,722.

(51) Int. Cl.
| | |
|---|---|
| *H04W 24/00* | (2009.01) |
| *H04W 4/029* | (2018.01) |
| *H04W 4/02* | (2018.01) |
| *H04W 4/20* | (2018.01) |
| *G08B 21/24* | (2006.01) |
| *G01S 1/68* | (2006.01) |

(52) U.S. Cl.
CPC .............. *H04W 4/029* (2018.02); *G01S 1/68* (2013.01); *G08B 21/24* (2013.01); *H04W 4/023* (2013.01); *H04W 4/20* (2013.01)

(58) Field of Classification Search
CPC ....... H04W 4/029; H04W 4/023; H04W 4/20; G01S 1/68; G08B 21/24

USPC ....................................................... 455/456.1
See application file for complete search history.

(56) References Cited

U.S. PATENT DOCUMENTS

| | | | | |
|---|---|---|---|---|
| 7,411,492 | B2 * | 8/2008 | Greenberg ........... | A01K 15/023 340/539.13 |
| 7,974,637 | B1 * | 7/2011 | Taveniku ............. | G06Q 20/203 455/456.1 |
| 8,121,609 | B2 * | 2/2012 | Bosnjakovic .......... | G01S 19/06 455/456.1 |
| 8,320,264 | B2 * | 11/2012 | Arpee .................. | H04B 17/309 370/252 |
| 8,643,486 | B2 * | 2/2014 | Hess .................. | G08B 13/1409 340/539.13 |
| 10,315,085 | B2 * | 6/2019 | Danis ................. | A63B 69/0002 |

(Continued)

OTHER PUBLICATIONS

United States Office Action, U.S. Appl. No. 16/892,165, dated Jul. 9, 2020, 9 pages.

*Primary Examiner* — Amancio Gonzalez
(74) *Attorney, Agent, or Firm* — Fenwick & West LLP

(57) ABSTRACT

A tracking system determines a location of a tracking device associated with a user using one or more access points at the location. Each access point at the location is configured to detect and couple with the tracking device when the tracking device is within a communicative range of the access point. An access point provides updates on the tracking device's presence, as well as the tracking device's arrival to and departure from the communicative range of the access point, to a tracking server. The tracking server determines, from these updates, whether the tracking device is at the location. The user may be notified, via a mobile device, of the tracking device's location.

20 Claims, 20 Drawing Sheets

(56) References Cited

U.S. PATENT DOCUMENTS

| | | | | |
|---|---|---|---|---|
| 10,423,926 | B1* | 9/2019 | Nagpal | H04W 4/35 |
| 10,536,812 | B2* | 1/2020 | Pylappan | H04L 67/18 |
| 10,575,138 | B1 | 2/2020 | Klinkner et al. | |
| 10,708,722 | B1* | 7/2020 | Klinkner | H04W 4/20 |
| 2009/0149171 | A1* | 6/2009 | Arpee | H04W 84/042 |
| | | | | 455/423 |
| 2009/0201149 | A1* | 8/2009 | Kaji | G01S 5/0294 |
| | | | | 340/539.13 |
| 2010/0035630 | A1* | 2/2010 | Bosnjakovic | G01S 19/06 |
| | | | | 455/456.1 |
| 2012/0270559 | A1* | 10/2012 | Ingerson | G08B 21/0288 |
| | | | | 455/456.1 |
| 2014/0361874 | A1* | 12/2014 | Mandalapu | G08B 25/016 |
| | | | | 340/8.1 |
| 2018/0284293 | A1* | 10/2018 | Pan | G01S 19/43 |
| 2019/0235092 | A1* | 8/2019 | Bastian, II | G01S 19/48 |

\* cited by examiner

TRACKING DEVICE PRESENCE DETECTION AND REPORTING BY ACCESS POINTS

CROSS REFERENCE TO RELATED APPLICATIONS

This application is a continuation of U.S. application Ser. No. 16/892,165, filed Jun. 3, 2020, now U.S. Pat. No. 10,812,945, which is a continuation of U.S. application Ser. No. 16/530,835, filed Aug. 2, 2019, now U.S. Pat. No. 10,708,722, all of which are incorporated by reference in their entirety.

BACKGROUND

This disclosure relates generally to tracking devices, and more specifically, to access point functionality in a tracking device environment.

Users can attach tracking devices to one or more personal objects, such as keys, a phone, a car, a briefcase, a laptop, and the like. The tracking device can communicatively couple to a mobile device of the user (or of a community member), and the mobile device can, in response to receiving a communication from the tracking device, determine a location of the mobile device (for instance, via a GPS receiver). The mobile device can then provide an identifier for the tracking device and the determined location of the mobile device to a cloud server, which can associate the tracking device with the determined location of the mobile device.

Tracking devices may move around with a user as they go about their daily activities, and can be coupled to user devices, such as a laptop, smart phone, or other mobile device, while moving with the user. The user may want to determine the location of the tracking device. Using the user's mobile device to determine the location may take several minutes and may be unreliable given the long communicative range of a mobile device. In addition, the mobile device may not be in a range of the tracking device, thereby leaving the user unable to determine the tracking device's location. Thus, there is a need to locate the tracking device without requiring coupling to the mobile device.

SUMMARY

A tracking system determines a tracking device's location by using one or more access points. A geographic boundary associated with a location may include a set of access points. At least one of the access points within the geographic boundary may couple to the tracking device. Each of the access points can communicate with a tracking server of the tracking device, providing updates on the tracking device's presence and location within the geographic boundary.

When a user leaves a location, inadvertently leaving the tracking device behind, a mobile device of the user can determine that the tracking device is not coupled to the mobile device, though this process can take several minutes, during which the mobile device continues to scan for signals from the tracking device. To expedite this determination, the tracking system queries one or more access points of the location, checking if at least one access point is coupled to the tracking device. Upon confirming that the tracking device is coupled to an access point, the tracking system can determine that the mobile device is not coupled to the tracking device, and beneficially enabling the user to be notified that the tracking device has been left behind. Otherwise, the user may have to wait the several minutes before the tracking system determines that the tracking device has been left behind, during which time the user may move further away from the location, increasing the amount of time and inconvenience required to turn around and retrieve the tracking device.

The tracking server determines that the tracking device is at a location when at least one of the access points at the location detects the tracking device. The tracking server may instruct all the access points within the geographic boundary to provide an instruction to the tracking device (for instance, at the request of an owner of the tracking device), thereby increasing the likelihood that the tracking device receives the instruction. For instance, if each access point at a location provide an instruction to the tracking device to ring, the likelihood that the tracking device rings increases, thereby enabling the user to more easily locate the tracking device at the location.

The access points that detect the tracking device may provide the tracking server with the location of the tracking device at a default transmission frequency. The tracking device's location data may be duplicative, particularly while the tracking device remains at the location. Accordingly, the access points that detect the tracking device at the location may report the tracking device's location at a slower frequency, and may also report the arrival and the departure of the tracking device to and from the location.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
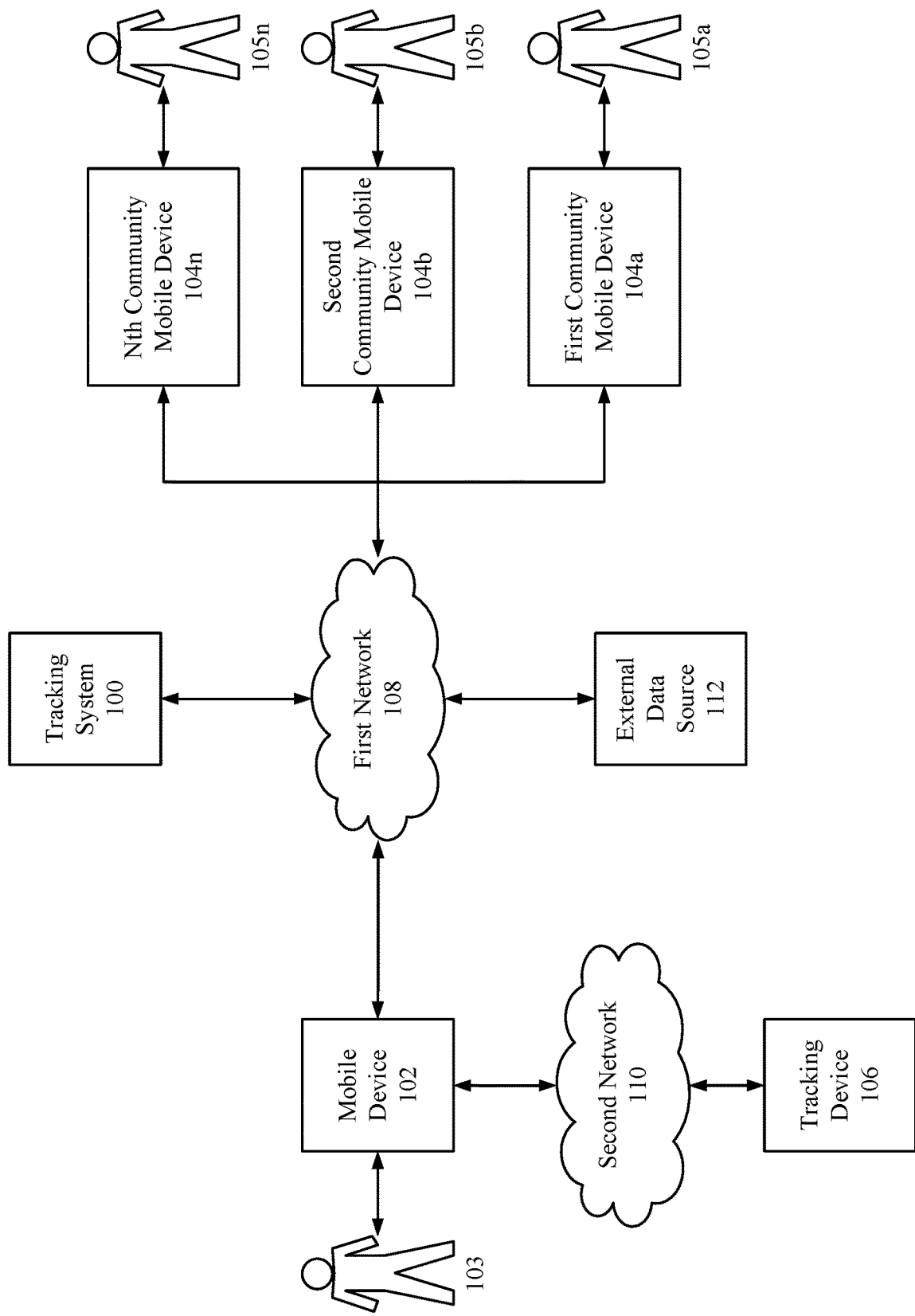
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible. FIG. 1 also illustrates an external data source 112 that is communicatively coupled to the tracking system 100 to provide additional, external data to the tracking system 100, as is discussed further below. Examples of external data sources include: social networking systems, messaging systems, calendaring systems, banking systems, budgeting systems, vendor systems, online retailers, parking regulation databases, weather service, travel agency, transportation services, ride-sharing systems, geo-locating systems, contact management systems, and the like.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance (and/or a relative direction) between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
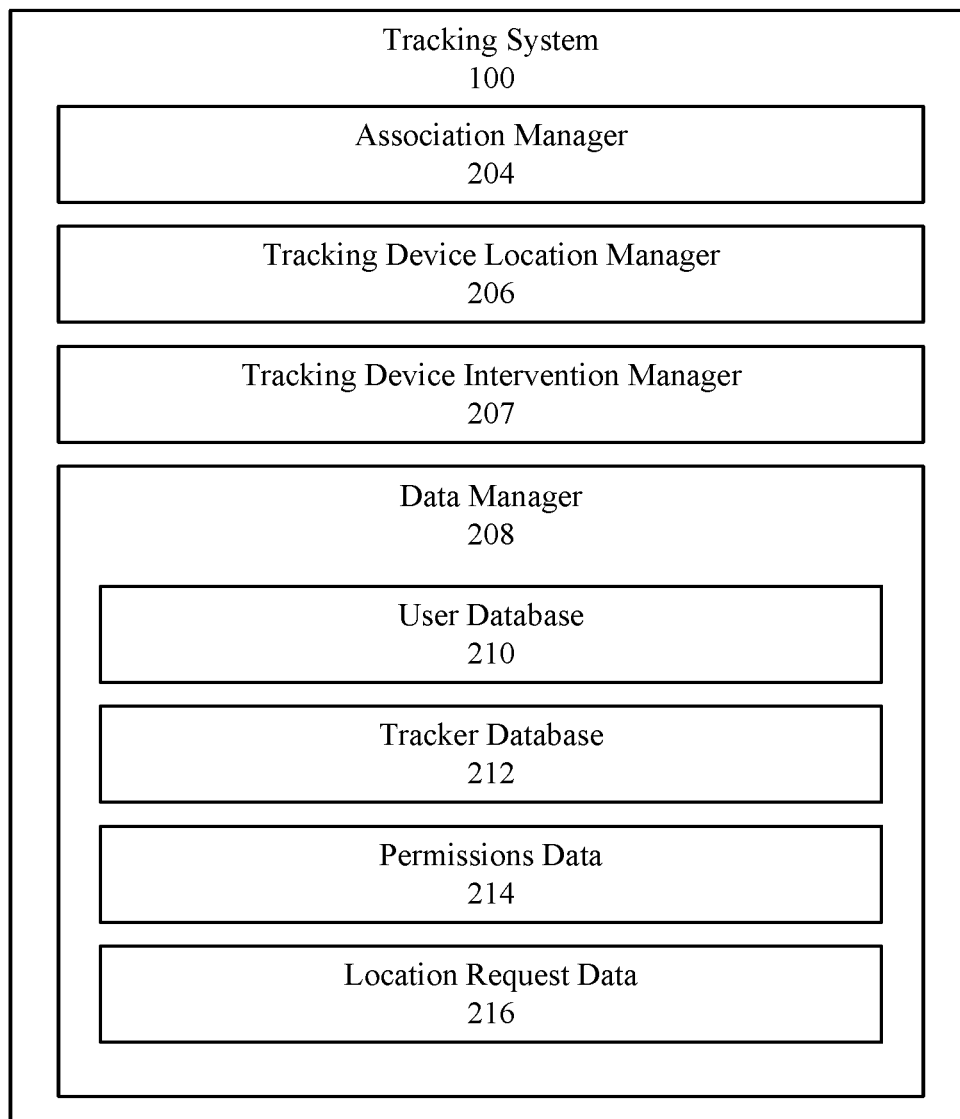
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, a tracking device intervention manager 207, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or no longer lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a tracking device intervention manager 207. The tracking device intervention manager 207 can identify whether a tracking device is lost or has been left behind, or can predict a state of the tracking device based on, for instance, the location of a tracking device relative to other tracking devices, the location of a tracking device relative to a user's phone, and the location of a tracking device relative to historical user data. When a device is determined to be lost or left behind, or when a state of the tracking device has been predicted, the tracking device intervention manager 207 can notify a user, for instance via a notification sent to and displayed by a mobile device 102 of the user. The tracking device intervention manager 207 is described below in greater detail.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
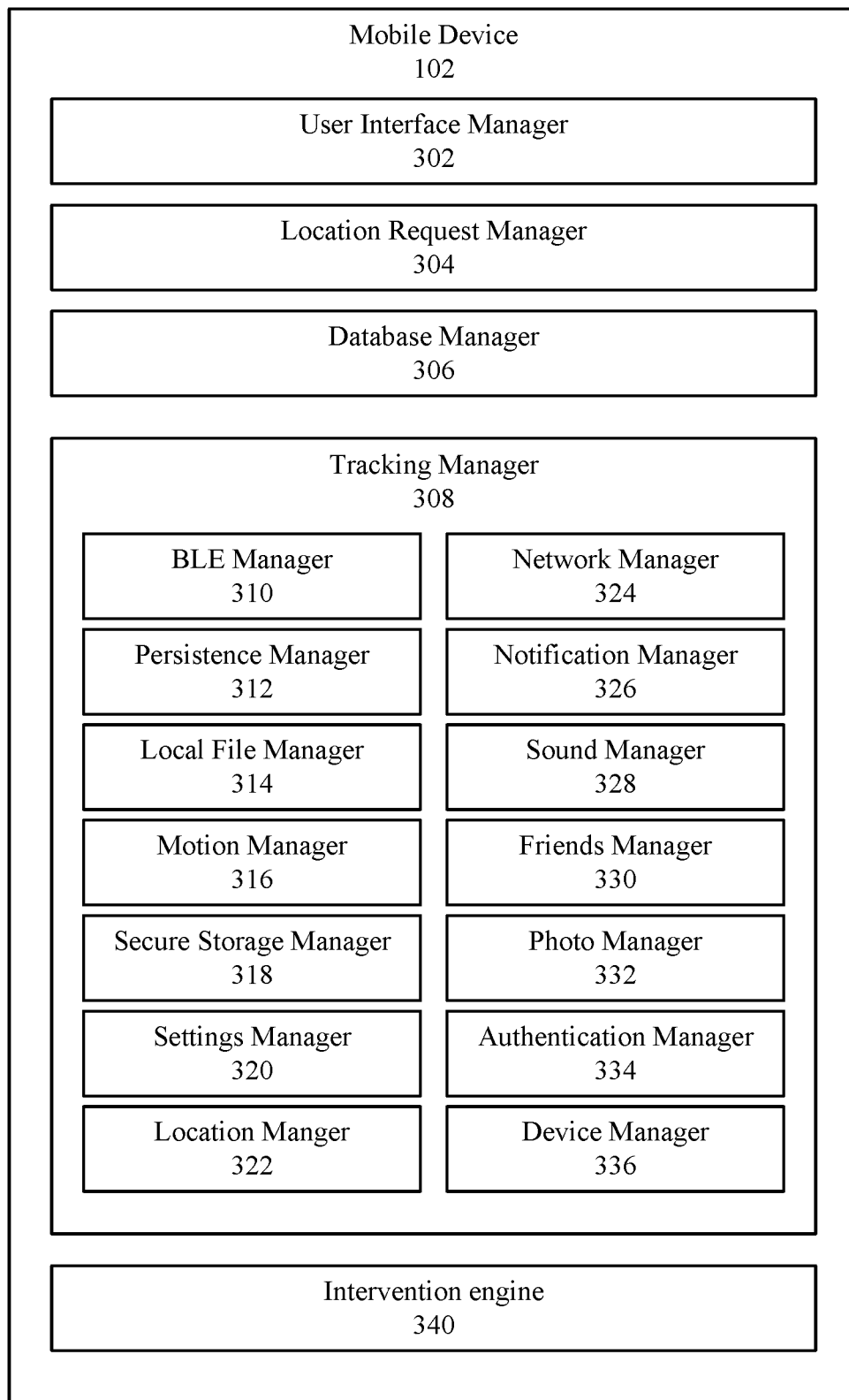
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, a tracking manager 308, and an intervention engine 340, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102. For example, the user interface manager 302 can facilitate the providing of power settings to the tracking device 106 for power management on the tracking device 106 by the user 103.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager 318 may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

The mobile device 102 may further include an intervention engine 340. The intervention engine 340 is configured to, in response to a determination that a tracking device may be lost (or inadvertently left behind, misplaced, forgotten, stolen, etc.), notify a user that the tracking device may be lost or left behind. In some embodiments, the determination that the tracking device may be lost or left behind may be made by the tracking system 100 and communicated to the mobile device 102, may be made by a different tracking device and communicated to the mobile device, or may be made by the intervention engine 340. Likewise, the intervention engine 340 is configured to, in response to predicting a state of the tracking device, notify a user of the tracking device of the predicted state of the tracking device. The state of the tracking device can be predicted by the tracking system 100 and communicated to the mobile device 102, or may be made by the intervention engine 340. The intervention engine 340 can notify a user of the mobile device 102 that a tracking device may be lost or left behind, or can notify the user of the predicted state of the tracking device in a number of ways, for instance by displaying a notification within a graphical notification interface of the mobile device, by displaying a status or notification within an application interface of the mobile device, by emitting an alarm or notification audio, or the like.

Figure 4:
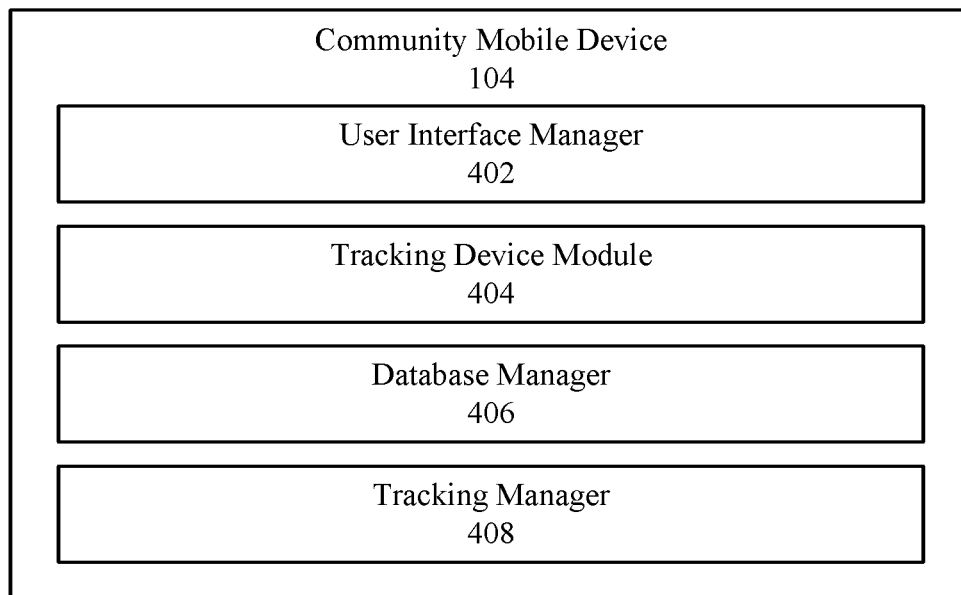
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
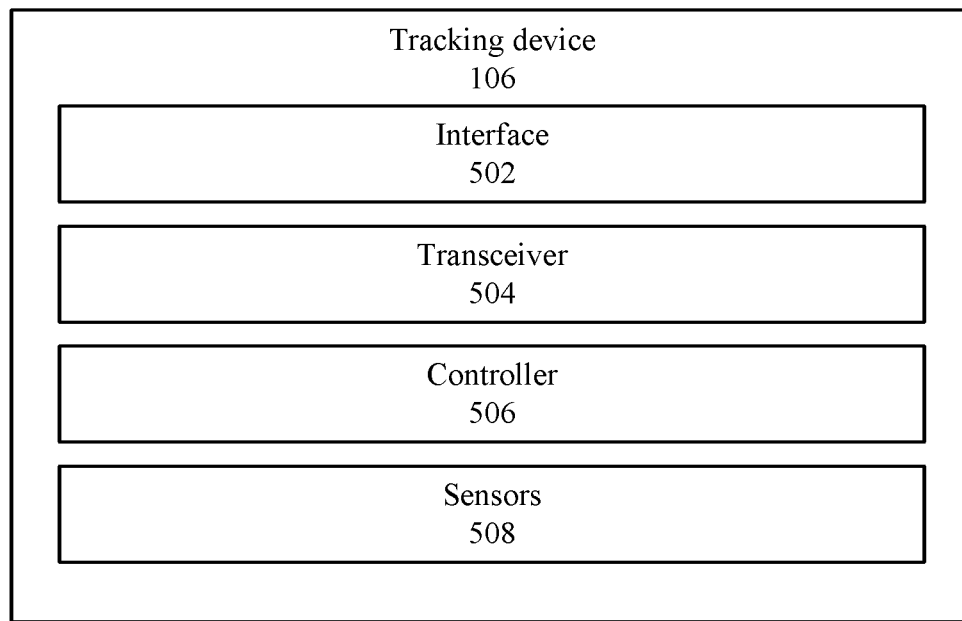
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the transceiver 504 can include a BLE receiver and transmitter, though in other embodiments, the transceiver 504 enables communications via other suitable wireless connection protocols (such as WiFi, Global System for Mobile Communications or "GSM", LTE, and the like). It should be noted that while various examples herein describe the transceiver 504 as a GSM receiver and transmitter, this is done for the purposes of brevity, and it should be emphasized that the transceiver 504 can communicate over any other wireless communication protocol according to the embodiments described herein.

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable communicative functionality of the tracking device 106, can configure the tracking device into a sleep mode or awake mode, can configure the tracking device into a power preservation mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), altimeters, GPS transceivers, orientation sensors, proximity sensors, communication sensors, light sensors, temperature sensors, pressure sensors, touch sensors, audio sensors, or any other suitable sensor configured to detect an environment of the tracking device 106, a state of the tracking device 106, a movement or location of the tracking device 106, and the like. The sensors 508 are configured to provide information detected by the sensors to the controller 506, which in turn can provide the information detected by the sensors to a mobile device 102 communicatively coupled to the tracking device 106.

Tracking Device Collection Overview

Tracking devices can be organized into collections of tracking devices that are commonly co-located, that may move similarly, that are often kept close together, that are used similarly or for a common purpose, that are attached to related or similar objects, that are associated with a common subject matter, or that behave in a similar way. As used herein, a "collection" refers to a pre-determined set of tracking devices. Collections of tracking devices can include one, two, or more tracking devices, and the identities of each collection and the identities of the tracking devices within each collection can be stored within the tracker database 212, within a mobile device 102 of a user associated with the collection, or any other suitable location.

Tracking device collections can be defined by users. For instance, a user can create a collection via an application interface or other mobile device interface, via a web page interface associated with the tracking system 100, or the like. The user can select a set of tracking devices owned or managed by the user, can associate with the selected tracking devices, and can name or otherwise identify the collection. For instance, the user can select tracking devices that are attached to objects needed by the user for the user's job, can create a collection of "work" tracking devices, and can name the collection, all via an application running on the user's mobile device 102. The mobile device 102 can then communicate the defined collection to the tracking system 100 for storage.

Alternatively, tracking device collections can be defined by the tracking system 100, based on common historical behavior/usage patterns associated with a set of tracking devices. For instance, if a set of tracking devices (e.g., a first tracking device coupled to a user's wallet, a second to a user's ID badge, and a third to a user's briefcase) commonly accompanies a user from a home location to a work location weekday mornings, and likewise from the work location to the home location weekday evenings, the set of tracking devices can be grouped together in a tracking device collection. As described above, tracking devices are coupled to objects, and the user can identify to the tracking system 100 (for instance, via the mobile device 102) the identity of the objects to which the tracking devices are attached. Accordingly, the tracking system 100 can define collections of tracking devices based on the identified types of objects to which a set of tracking devices are coupled. For example, if a user identifies an object to which a first tracking device is coupled as "luggage", and identifies an object to which a second tracking device is coupled as "passport", the tracking system 100 can define a "travel" tracking device collection based on a pre-determined likelihood that a user's luggage and passport are likely to be used together.

In some embodiments, the tracking system 100 can identify a candidate tracking device collection (e.g., by identifying a set of tracking devices), and can present or suggest the candidate tracking device collection to a user (for instance, via the user's mobile device 102). For example, the travel system 100 can identify a set of tracking devices that commonly move in conjunction with a user's car, and can suggest a candidate "car" tracking device collection to the user. If the user agrees to define a tracking device collection based on the presented candidate tracking device collection, the tracking system 100 can store the tracking device collection.

In some embodiments, the tracking system 100 can identify a candidate tracking device likely to be related to a defined tracking device collection, and can present or suggest the candidate tracking device to the user to add to the tracking device collection. For example, if a user has defined a "travel" collection of tracking devices including a passport tracking device and luggage tracking device, and the tracking system 100 determines that a tracking device coupled to a camera bag is commonly co-located with the passport and luggage (or moves in conjunction with the passport and luggage), then the tracking system can suggest to the user (for instance, via the user's mobile device 102) that the user add the camera bag to the travel tracking device collection. If the user accepts the suggestion and adds the suggested tracking device to the tracking device collection, the tracking system 100 can update the stored tracking device collection to include the suggested tracking device.

In some embodiments, an interface of the user's mobile device (such as an application interface, a web page interface, and the like) can display one or more tracking device collections to the user. For instance, the mobile device can display a selectable icon, button, or display portion corresponding to the tracking device collection. When a user selects the tracking device collection, the mobile device can identify tracking devices within the selected tracking device collection, and can display information associated with the identified tracking devices within the collection (such as location information, status information, information about the object to which the tracking device is coupled, and the like). For instance, the user can select a "work" tracking device collection from an interface of the application associated with the tracking system 100, and the application can display information associated with a first tracking device coupled to a user's keys, a second tracking device coupled to the user's ID badge, and a third tracking device coupled to the user's briefcase.

Examples of tracking device collections include but are not limited to:

Car accessory tracking devices: a wallet, glasses, spare tire, garage door remote control, parking pass, toll road/bridge payment sensor, keys, phone charger, jumper cables, car jack, auxiliary cable
  Travel tracking devices: luggage, phone charger, laptop charger, makeup/toiletry bag, passport, digital book/reader, computer, tablet, phone, camera, headphones, airpods, water bottle, jacket, pillow
  Purse tracking devices: purse, wallet, checkbook, keys, pillbox
  Work tracking devices: laptop, tablet, phone, ID badge, headphones, wallet, briefcase
  School tracking devices: backpack, lunch bag, laptop, books
  Home tracking devices: remote control, safe, jewelry box, tools, toolbox, artwork
  Camping tracking devices: tent, sleeping bags, headlamp, flashlight, lanterns, first aid kit
  Skiing/snowboarding tracking devices: skis, snowboard, coat, gloves, helmet, goggles, ski pass
  Golf tracking devices: clubs, bag, shoes, hat
  SCUBA tracking devices: fins, mask, tank, wetsuit, flashlight, weight belt, buoyancy compensator
  Art/antique tracking devices: tracking devices coupled to artwork or antiques
  Photography tracking devices: camera bag, camera, lenses, tripods, flash gear
  Public tracking devices: tracking devices coupled to buses, food trucks, and the like
  Computer/laptop accessories tracking devices: laptop, tablet, charger, dongle, mouse, keyboard, monitors, external hard drive, web camera
  Tool tracking devices: hammer, screwdriver, wrench, saw, safety glasses, tool box
  Emergency supplies tracking devices: fire extinguisher, water containers, canned foods, flashlights, emergency radio
  Baby/child tracking devices: baby bag, diapers, toys, baby powder, baby wipes, books, car seat, stroller, clothes
  Gym tracking devices: gym shoes, gym bag, extra clothes, towel, joint brace/support
  Beach tracking devices: towel, sunscreen, beach umbrella, water bottle, surfboard, cooler Rain-gear tracking devices: jacket, hat, poncho, umbrella, rain boots Snow-gear tracking devices: jacket, hat, ear muffs, scarf Warm-weather tracking devices: sunscreen, sunglasses, sandals, water bottle Valuable item tracking devices: Art, antique, television, jewelry/jewelry box, safe, monitor, computer Tracking Device Intervention Overview As used herein, a tracking device "intervention" can refer to notifying a user, owner, or manager of a tracking device that the tracking device may be lost, may be forgotten, or may be inadvertently left behind (collectively referred to as "potentially lost" hereinafter). In some embodiments, a tracking device intervention can refer to notifying a user of a predicted state or behavior of a tracking device (collectively referred to as "predicted state" hereinafter). In each case, a tracking device is either identified as potentially lost or a state of the tracking device is predicted, and in response, a notification is sent to a user of the tracking device.

During the performance of a tracking device intervention, a user can be notified of the predicted state of the tracking device or that the tracking device is potentially lost via a mobile device 102, for instance via a notification displayed within a mobile device or application interface, via an audio signal or vibration signal, and the like. As also noted above, any of the tracking system 100, the mobile device 102, or a tracking device 106 can identify a tracking device is potentially lost or can predict a state of the tracking device, though the remainder of the description will refer to the tracking system identifying a tracking device as potentially lost for the purposes of simplicity.

A notification that a tracking device is potentially lost can include information about a last known location of the tracking device (for instance, displayed on a map displayed by a mobile device), can include information identifying the tracking device (such as a name of the tracking device, the identity of the object to which the tracking device is attached, or an icon corresponding to the tracking device), can include information identifying a tracking device collection to which the tracking device belongs (such as a name of the tracking device collection or an icon corresponding to the tracking device collection), and can include text indicating why the tracking device is thought to be lost or left behind (e.g., "you normally take your briefcase to work with you, and you left it behind today"). A notification of a predicted state of the tracking device can include information identifying the tracking device or a tracking device collection to which the tracking device belongs, can include information describing the predicted state of the tracking device (e.g., "you might want to bring this tracking device with you before you leave for work"), and can include information describing the circumstances under which the state of the tracking device is predicted (e.g., "it is warmer than normal outside today, don't forget to bring your water bottle").

In some embodiments, a notification of a predicted state of the tracking device or identifying a tracking device as potentially lost can include an option to disregard the notification. For instance, if the notification indicates that a tracking device is potentially lost, the user can select an option displayed by or associated with the notification to identify the tracking device as not lost. Likewise, if the notification indicates a predicted state of the tracking device reminding a user to bring an object coupled to a particular tracking device, the user can select an option displayed by or associated with the notification to disregard the reminder. Likewise, in some embodiments, a notification that a tracking device is identified as potentially lost can include an option to confirm the tracking device as lost. In response to the selection of such an option by a user, the tracking system 100 can affirmatively classify the tracking device as lost according to the principles described herein.

The tracking system 100 can identify a tracking device 106 as potentially lost or can predict a future state of the tracking device based on a number of factors, including but not limited to: a proximity of a tracking device to one or more additional tracking devices, a proximity of a tracking device to a user's mobile device, a movement of a tracking device to more than a threshold distance away from a mobile device or one or more additional tracking devices, a location of a tracking device relative to a particular or pre-defined geographic location (such as GPS coordinates, a user's home, a user's place of employment, etc.), a location of a tracking device relative to particular or pre-defined geographic boundaries (such as boundaries within a map, property lines, and the like), based on a usage or movement behavior of the tracking device, based on a usage or movement behavior of a user or owner of a tracking device, based on information received from an external source (for instance, via an API corresponding to the API), based on information received from sensors within the tracking device or a user's mobile device (such as motion sensors), based on a current time or date, based on a low battery level, based on a malfunction of the tracking device or a tracking device component, or based on any other suitable factors. Circumstances in which the tracking system 100 can identify a tracking device 106 as potentially lost or can predict a state of the tracking device are described in greater detail below.

Tracking Device Proximity:

The tracking system 100 can identify a tracking device 106 as potentially lost in response to determining that the tracking device is not located within a threshold distance (such as a wireless communicative range, a selected threshold distance, or a pre-determined distance) of a target device (such as a user's mobile device or of one or more additional tracking devices). For instance, if a tracking device is commonly located within a threshold distance of a user's mobile device, the tracking system 100 can flag the tracking device as potentially lost in response to a determination that the tracking device is located outside the threshold distance of the user's mobile device. In addition, if a tracking device is commonly located within a threshold distance of a second tracking device, the tracking system can flag the tracking device as potentially lost in response to a determination that the tracking device is located more than a threshold distance away from the second tracking device. Likewise, if a tracking device is part of a tracking device collection, the tracking system 100 can flag the tracking device as potentially lost in response to a determination that the tracking device is located more than a threshold distance away from one or more additional tracking devices within the tracking device collection.

It should be noted that the determination that a tracking device is potentially lost in response to proximity to another tracking device, a tracking device collection, or a user's mobile device can be based on time. For instance, if two tracking devices are commonly located within a threshold distance of each other during normal work hours for a user, but aren't commonly located within the threshold distance of each other outside of work hours, the tracking system 100 may flag a first of the tracking devices as potentially lost only if the first tracking device is located more than the threshold distance from the second tracking device during work hours, and may not flag the first tracking device as potentially lost if the first tracking device is located more than the threshold distance from the second tracking device outside of work hours.

The tracking system 100 can determine that a tracking device 106 is not within a threshold proximity of a mobile device 102 by determining that the tracking device is outside of the transmission or communicative range of the mobile device. For instance, if the mobile device and the tracking device are configured to communicatively couple via the Bluetooth protocol, the tracking system 100 can determine that the tracking device 106 is outside of a threshold proximity of the mobile device 102 if the mobile device is unable to receive Bluetooth advertisements or communications from the tracking device. The tracking system 100 can determine that a first tracking device is not within a threshold proximity of one or more additional tracking devices by determining that the one or more additional tracking devices are within the transmission or communicative range of one or more mobile devices, and that the first tracking device is not within the transmission or communicative range of the one or more mobile devices. Likewise, the tracking system 100 can determine that a tracking device 106 is not within a threshold proximity of a mobile device 102 or one or more additional tracking devices by determining a location of the tracking device (e.g., from a community mobile device 104 different than the mobile device 102, from a database storing a last known location of the tracking device, or from any other suitable source), and determining that the determined location of the tracking device is greater than a threshold distance away from the mobile device 102 or the one or more additional tracking devices.

In some embodiments, the tracking system 100 can flag a tracking device 106 as potentially lost in response to the movement of the tracking device from within a threshold distance of a mobile device 102 to greater than a threshold distance of the mobile device. In some embodiments, the tracking system 100 can flag a tracking device 106 as potentially lost in response to the severing of a communicative connection between the tracking device and a mobile device 102 (for instance, as a result of the movement of the tracking device and the mobile device away from each other). In some embodiments, a user can select the threshold distance used by the tracking system 100 to trigger a determination that the tracking device 106 is potentially lost, for instance via an interface of the mobile device 102.

Figure 6:
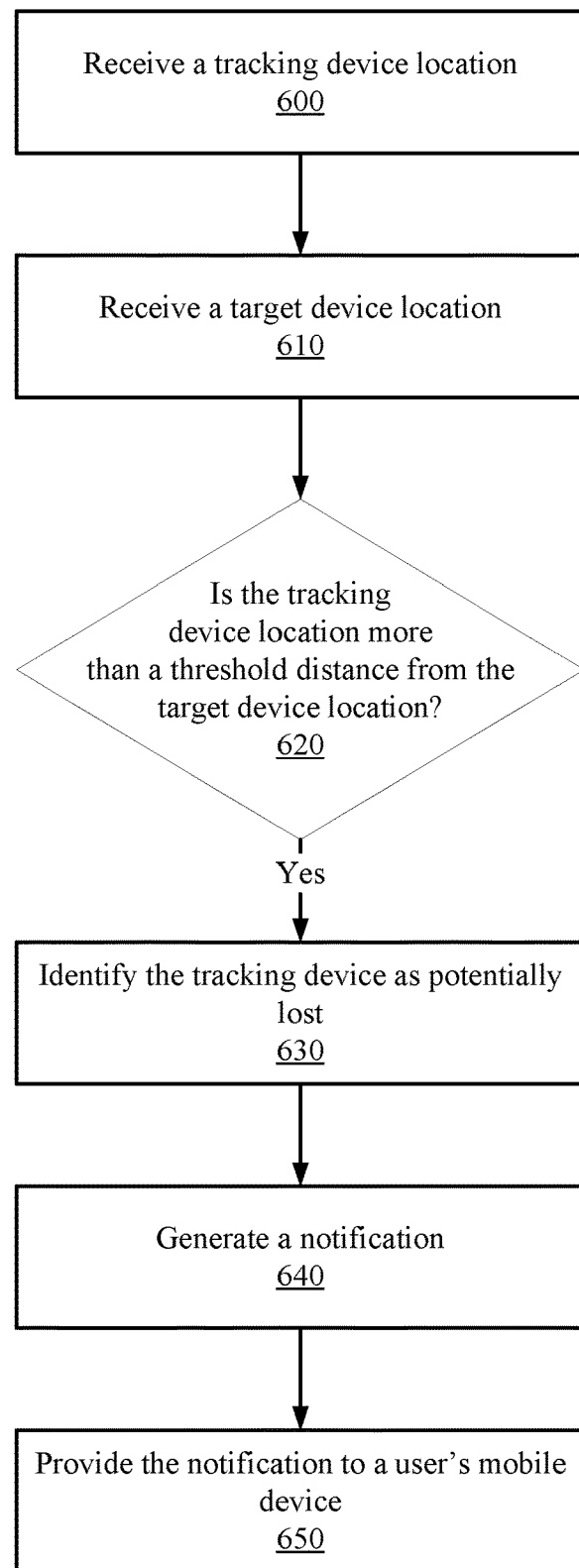
FIG. 6 illustrates a flowchart for a method of identifying a tracking device as potentially lost based on a threshold distance from a target device, according to one embodiment.

FIG. 6 illustrates a flowchart for a method of identifying a tracking device as potentially lost based on a threshold distance from a target device, according to one embodiment. Alternate embodiments may contain more, fewer, or different steps, or the steps may be performed in an order different from the one shown in FIG. 6.

The tracking system 100 receives 600 a location of a user's tracking device and receives 610 a location of a target device. In some embodiments, the tracking device location is received from a mobile device of a user different from the user to whom the tracking device belongs. The target device can be another tracking device, a user's mobile device, or any other suitable system. The tracking system 100 determines 620 whether the tracking device location is more than a threshold distance from the target device location. If the tracking device location is determined to be more than the threshold distance from the target device location, the tracking system identifies 630 the tracking device as potentially lost. The tracking system 100 generates 640 a notification identifying the tracking device and indicating that the tracking device is potentially lost, and provides 650 the generated notification to the user's mobile device. The user's mobile device can be configured to display the notification to the user.

Examples

In some embodiments, the tracking system 100 notifies a user that a tracking device is potentially lost if the tracking device is not located with a threshold distance of the user's mobile device and if the tracking device is coupled with an object the user uses regularly. For example, the user may be notified as such if the tracking device is coupled to keys, a wallet, a phone, glasses, a watch, a laptop, a digital book/reader, or a tablet. The threshold distance can be selected by the user or the tracking system 100 such that the tracking device is on the user's person or within the user's immediate vicinity (e.g. ≤5 feet), or may be selected such that the user is reminded to bring the object when the user leaves an area (e.g. approximately 15 feet). In some embodiments, the user designates which tracking devices are coupled to objects the user uses regularly. The user may also designate time periods during which those designated tracking devices should be within a threshold distance of the user's mobile device. For example, the user may designate the user's work hours, workout hours, sleeping hours, dining hours, relaxation hours, traveling hours, class hours, or commuting hours.

In some embodiments, the tracking system may notify a user that a tracking device is potentially lost if a tracking device was located within the threshold distance of the user's mobile device when the user left a geographic location and the tracking device is not located within the threshold distance of the user's mobile device before the user returns to that geographic location. For example, if the tracking device is coupled to a tablet, if the user leaves home with the tablet and the tracking system 100 determines that the tablet tracking device is not within a threshold distance of the user's mobile device before the user returns home, the tracking system 100 may notify the user that the tablet tracking device is potentially lost. The threshold distance may be selected such that if the tracking device is near the user or in the user's car (e.g. 2-5 feet), the tracking device is not identified as potentially lost. Example geographic locations include the user's home, work, school, gym, or car.

In some embodiments, the tracking system 100 notifies the user that a tracking device coupled to car accessory may not be in the car based on whether the car accessory tracking device is located within a threshold distance of a tracking device coupled to the car. For example, if a tracking device coupled to the user's parking pass is not located within the threshold distance of a tracking device coupled to a car, the tracking system 100 may notify the user that the parking pass tracking device is not in the car. In such embodiments, the tracking system 100 may only notify the user if the user's mobile device is located within a threshold distance of the car tracking device. For example, the tracking system 100 may notify the user if a phone charger tracking device is not located within a first threshold distance of a car tracking device if the user is located within a second threshold distance of the car tracking device (e.g. if the user is in the car and about to leave).

In some embodiments, the tracking system 100 provides notifications to the user's mobile device if the user is traveling and based on whether the travel tracking device is located within a threshold distance of the user's mobile device. For example, if the user is on an airplane, the user may be notified that a travel tracking device (e.g. a luggage tracking device, a laptop tracking device, a phone tracking device) is not on the user's airplane if the travel tracking device is not located within a threshold distance of the user's mobile device or a tracking device coupled to the airplane. Additionally, the tracking system 100 may notify the user of a travel tracking device that is potentially lost if the travel tracking device is within a threshold distance of an airplane tracking device and not within a threshold distance of the user's mobile device (e.g. the user left the travel tracking device on the airplane).

In some embodiments, the tracking system 100 notifies the user that the user's luggage was sent to the wrong airport. The tracking system 100 can notify the user of such a state if the user's mobile device is located within a threshold distance of one airplane tracking device, and a luggage tracking device is located within a threshold distance of another airplane tracking device (or a community member's mobile device) that is at a different airport from the airport of the first airplane.

In some embodiments, the tracking system 100 notifies the user if the user has potentially lost a tracking device coupled to the user's passport. If a passport tracking device is not located within a threshold distance of the user's mobile device or other travel tracking devices (such as a luggage tracking device, a travel bag tracking device, etc.) while the user's mobile device or the travel tracking devices are at a travel hub (e.g. airport, seaport, train station), the user may be notified that the passport tracking device is potentially lost.

In some embodiments, the tracking system 100 notifies the user that a tracking device may have been stolen from the user's car if the tracking device is not located within a threshold distance of a car tracking device. For example, if the user leaves a tracking device coupled to a laptop in a car, and the laptop tracking device is not located within a threshold distance of the car tracking device, the user may be notified that the laptop tracking device has left the car. The tracking system 100 may only notify the user that a tracking device is potentially stolen if the user's mobile device is not detected within a threshold distance of the car tracking device during the time period in which the potentially stolen tracking device was determined to be outside the threshold distance from the car. For example, a user may have left a laptop tracking device in a car, and as a result, the laptop tracking device may be within a threshold distance of a car tracking device. If the laptop tracking device is determined to be outside the threshold distance from the car tracking device before the user returns to the car (e.g. when the user's mobile device is within a threshold distance of the car tracking device), the user can be notified that the laptop tracking device has been stolen.

In some embodiments, the tracking system 100 notifies the user when a tracking device associated with a child is not located within a threshold distance of the user's mobile device. For example, a tracking device may be coupled to the child's phone, jacket, backpack, shoes, or toys. The user may configure the threshold distance of the child tracking device based on where the child is. For example, if the child is at the park, the threshold distance may be larger than if the child is at a theme park. In some embodiments, the user is notified when the child tracking device is not located within a threshold distance of another tracking device, such as a tracking device given to a baby sitter to locate the child tracking device. In these embodiments, if the child tracking device is not located within a threshold distance of the other tracking device, the tracking system 100 may notify the user through the user's mobile device that the child tracking device is outside the threshold distance of the user's mobile device or another tracking device.

In some embodiments, the tracking system 100 will notify the user of a potentially lost tracking device when the user's mobile device is at a particular geographic location/within a geographic boundary and when the tracking device is not located within a threshold distance of the user's mobile device. For example, if the user's mobile device is at a store, the tracking system 100 may notify the user of a potentially lost wallet tracking device if the wallet tracking device is not located within a threshold distance of the user's mobile device while the user is at the store. The tracking system 100 may flag one or more tracking devices from a particular collection of tracking devices depending on which geographic location or geographic boundary the mobile device is in. For example, if the mobile device is at the airport, the tracking system 100 may notify the user if a travel tracking device is not located within a threshold distance of the mobile device or another travel tracking device. If the mobile device is at the gym, the tracking system 100 may notify the user if a gym bag tracking device is not located within a threshold distance of the mobile device or another workout tracking device. If the mobile device is at the beach, the tracking system 100 may notify the user if a beach gear tracking device is not located within a threshold distance of the mobile device or another beach tracking device. If the mobile device is at work, the tracking system 100 may notify the user if a work tracking device is not located within a threshold distance of the mobile device or another work tracking device. If the mobile device is at a campsite, the tracking system 100 may notify the user if a camping tracking device is not located within a threshold distance of the mobile device or another camping tracking device.

Geographic Location:

The tracking system 100 can identify a tracking device 106 as potentially lost in response to determining that the tracking device is more than a threshold distance from a selected geographic location (for instance, defined by geographic coordinates), or outside of an area defined by a selected geographic boundary (for instance, boundaries associated with a house or building, boundaries associated with property lines or a property lot, and the like). The geographic location or geographic boundary can be defined or selected by a user, for instance, via an interface of the mobile device 102 or of the tracking system 100. For example, a user can define a set of GPS coordinates as a selected location, or can draw a set of geographic boundaries within a map interface. In some embodiments, a user can select a threshold distance or can change a pre-set threshold distance for use in conjunction with a selected geographic location (such that tracking devices located more than the selected threshold distance are identified as potentially lost).

The geographic location or geographic boundary can also be selected (for instance, by the tracking system 100) based on historical location data associated with the tracking device 106, a user, or a mobile device 102 associated with the user. For instance, if a tracking device 106 is commonly located within a geographic boundary associated with a user's work building during week day working hours, the geographic boundary can be selected by the tracking system 100 for use in determining if the tracking device is potentially lost. Likewise, if a tracking device 106 is commonly located within a threshold distance of a user's home on the weekend, a geographic location corresponding to the user's home (e.g., a set of GPS coordinates over which the user's home is located) can be selected by the tracking system 100 for use in determining if the tracking device is potentially lost.

In some embodiments, the tracking system 100 can identify a potential geographic location or geographic boundary for use in determining if a tracking device 106 is potentially lost based on historical location data associated with the tracking device, a user, or a mobile device of the user, and can present the potential geographic location or geographic boundary to the user. For instance, an application associated with the tracking system 100 can display a set of selectable potential geographic locations or geographic boundaries to the user, and can display information associated with the historical location data upon which each potential geographic location or geographic boundary is identified (for instance, the application can display a potential geographic location in conjunction with the text "recommended based on the location of this tracking device during weekdays between the hours of 9 am and 5 pm"). If the user selects the potential geographic location or geographic boundary, the tracking system 100 can store the geographic location or geographic boundary for future use in determining if the tracking device 106 is lost.

The tracking system 100 can determine that a tracking device 106 is not located within a threshold distance of a geographic location or is not located within a geographic boundary if 1) a location of the tracking device is received from a community mobile device 104 and 2) if the received location is more than a threshold distance away from the geographic location or is located outside of the geographic boundary. Alternatively, the tracking system 100 can determine that a tracking device 106 is located more than a threshold distance away from a geographic location or outside of a geographic boundary in response to 1) determining that a mobile device 102 of a user is located within the threshold distance of the geographic location or within the geographic boundary and 2) determining that the tracking device is not located within the communicative or transmission range of the mobile device (for instance, by determining that the mobile device cannot communicatively couple to the tracking device). In such embodiments, the communicative or transmission range of the mobile device 102 can be greater than the range defined by the geographic location and the threshold distance, and greater than the range defined by the geographic boundary.

Figure 7:
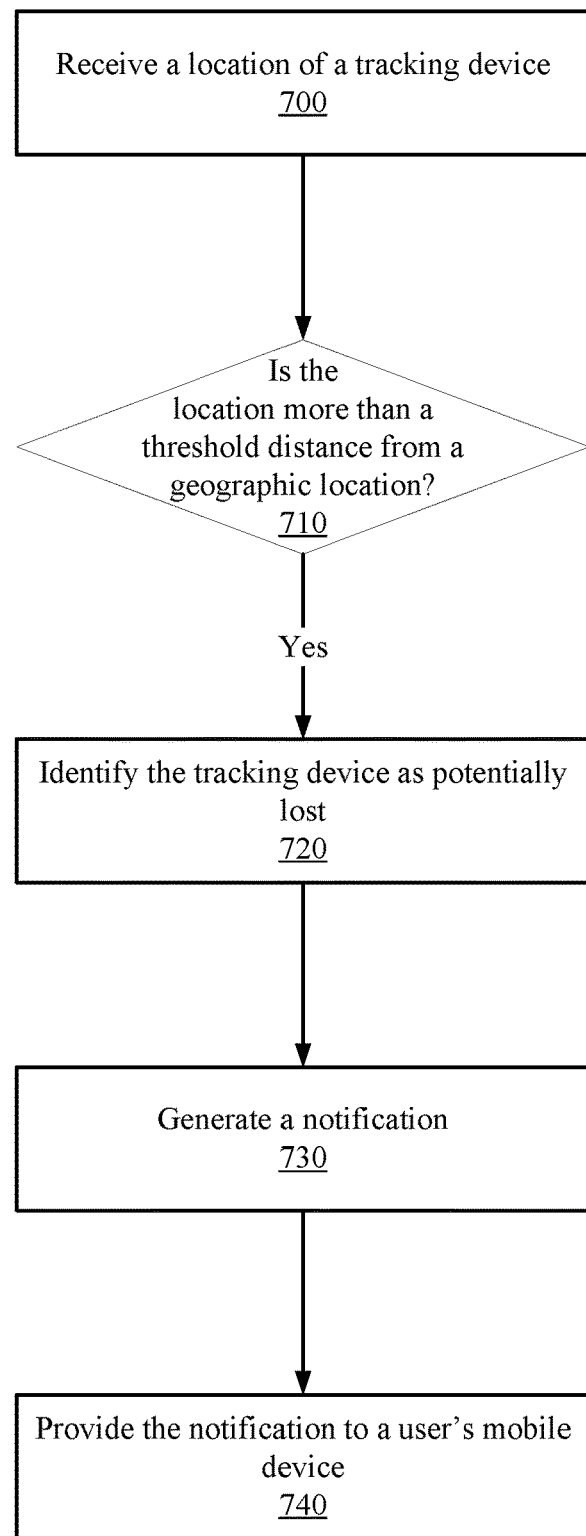
FIG. 7 illustrates a flowchart for a method of identifying a tracking device as potentially lost based on a threshold distance from a geographic location, according to one embodiment.

FIG. 7 illustrates a flowchart for a method of identifying a tracking device as potentially lost based on a threshold distance from a geographic location, according to one embodiment. Alternate embodiments may contain more, fewer, or different steps, or the steps may be performed in an order different from the one shown in FIG. 7.

The tracking system 100 receives 700 a location of a user's tracking device. In some embodiments, the tracking device location is received from a mobile device of a user different from the user to whom the tracking device belongs. The tracking system 100 determines 710 if the tracking device location is more than a threshold distance from a geographic location. As described above, in alternate embodiments, the tracking system determines if the tracking device location is outside of a geographic boundary. If the tracking system 100 determines that the tracking device location is more than the threshold distance from the geographic location (or outside the geographic boundary), the tracking system identifies 720 the tracking device as potentially lost. The tracking system 100 generates 730 a notification identifying the tracking device and indicating that the tracking device is potentially lost, and provides 740 the generated notification to the user's mobile device. The user's mobile device can be configured to display the notification to the user.

Examples

In some embodiments, the tracking system 100 notifies the user when a tracking device coupled to a set of keys leaves a geographic boundary. For example, if a business provides a set of keys to a temporary employee or a contractor, the tracking system 100 may notify the user when a keys tracking device is not located within a threshold distance of a geographic location or within a geographic boundary associated with an office of the business.

In some embodiments, a tracking device is coupled to a lifting weight or some other piece of exercise equipment and the tracking system 100 notifies the user when the lifting weight tracking device leaves a gym. Each lifting weight or piece of exercise equipment in a gym may be coupled to a tracking device and the notification to the mobile device may include information that identifies which lifting weight was not located within the gym.

In some embodiments, if the mobile device is located near a tourist destination and a tracking device coupled to a camera is located within a threshold distance of the mobile device, the tracking system 100 may notify the user through the mobile device that they may want to take out their camera and take pictures of the tourist destination.

In some embodiments, the tracking system 100 notifies the user that the user's car is potentially stolen if the car tracking device coupled to the user's car is located outside of a threshold distance from the geographic location where the user parked the car. The tracking system can determine a geographic location for where the user parked the car based on the geographic location of the car tracking device when the mobile device exceeded a threshold distance away from the car tracking device (e.g., when the user walked more than a threshold distance away from the car). If the car tracking device is located more than a threshold distance from the parking location, the tracking system 100 can notify the user that the car has potentially been stolen.

In some embodiments, the tracking system 100 notifies a user if a tracking device is not located within a room or a house. For example, if a tracking device is coupled to an object that is not supposed to leave a room (e.g. a remote control, reading glasses), the tracking system 100 may notify the user if the tracking device leaves the room/is not located within the room. The tracking system 100 may also notify the user that a tracking device coupled to a valuable item (such as a safe, a jewelry box, artwork, a television, a computer, etc.) may have been stolen from a house if the tracking device coupled to the valuable item is not located within the house.

In some embodiments, the tracking system 100 notifies the user if their child is not at a geographic location at which the child is supposed to be. If a tracking device associated with the child (e.g., a tracking device coupled to the child's bag or jacket) is not located within a threshold distance of a geographic location or within certain geographic boundaries (e.g. home, school, art/performance/music lessons, sport practice, friend's house), the user may be notified that the child is not located where they are supposed to be and may be provided with the location of the child tracking device.

In some embodiments, the tracking system 100 notifies the user if a tracking device coupled to a pet is not located within a threshold distance of the user's home or within the geographic boundaries of the user's home. For example, if the user's pet escapes or is stolen, the tracking system 100 can notify the user that the pet tracking device is not located within the user's home and can provide the location of the pet tracking device. In some embodiments, the tracking system 100 notifies the user if the pet tracking device enters a particular part of the user's home. For example, if the pet is not supposed to be inside the house or not supposed to be in a particular room of the house, the tracking system can notify the user that the pet tracking device is not where it is supposed to be based on whether the pet tracking device is or is not located within a threshold distance of a geographic location or whether the pet is or is not located within a geographic boundary.

Tracking Device Behavior:

The tracking system 100 can identify a tracking device 106 as potentially lost in response to a comparison of current tracking device behavior and location and historical tracking device behavior and location. For instance, the tracking system 100 can determine that a tracking device 106 commonly accompanies a user on the user's way to work based on an analysis of historical location data associated with the tracking device, and can flag the tracking device as potentially lost in response to determining that the tracking device is not accompanying the user on the user's way to work. Likewise, the tracking system 100 can determine that the tracking device 106 typically does not move between the hours of 10 am and 4 pm on weekdays based on an analysis of historical movement data associated with the tracking device, and can flag the tracking device as potentially lost in response to a determination that the motion of the tracking device exceeds a pre-determined motion threshold during this time interval. In addition, the tracking system 100 can determine that the tracking device 106 commonly communicatively connects with a mobile device 102 of a user after 10 pm on weekends based on an analysis of historical communication data associated with the tracking device, and can flag the tracking device as potentially lost in response to a determination that the tracking device has not communicatively connected to the mobile device on a weekend day after 10 pm after the passage of a threshold amount of time.

The tracking system 100 can predict a future state of the tracking device 106 based on a comparison of historical data associated with the tracking device. For instance, the tracking system 100 can determine that a tracking device 106 commonly travels between a first location and a second location between the hours of 5 pm and 6 pm, and can predict that the tracking device will be located at the second location after 6 pm in the event that the tracking device is outside the communicative range of a user's mobile device. Continuing with this example, the tracking system 100 can determine that the tracking device 106 commonly takes 30 minutes to reach the second location after leaving the first location, and can predict that the tracking device will reach the second location approximately 30 minutes after detecting that the tracking device has left the first location. Historical data analyzed by the tracking system 100 can include when, where, or how often the tracking device connects with the mobile device. In some embodiments, the tracking system 100 can analyze historical behavior of other tracking devices for use in predicting a state of the tracking device 106. In such embodiments, historical location and movement patterns of other tracking devices can be used to predict a location and/or movement of the tracking device 106 in response to a determination that the tracking device is undergoing similar location and movement patterns.

Examples

In some embodiments, the tracking system 100 identifies collections of tracking devices, as described above, for instance based on a history of the tracking devices tending to be located near each other or based on a collection definition from a user, and can notify the user that a tracking device of a collection is lost if the tracking device is not located near tracking devices in a collection. For example, the tracking system may determine that a keys tracking device and a wallet tracking device are typically located near each other, and thus may include the keys tracking device and the wallet tracking device in a collection. If the keys tracking device is subsequently not located near the wallet tracking device, the user may be notified that the keys tracking device or the wallet tracking device is potentially lost. In some embodiments, the tracking system 100 identifies tracking devices that are typically located near each other and may prompt the user to create a collection of the tracking devices or to add one or more of the tracking devices to an existing collection. For example, if the tracking system 100 determines that a toiletry bag tracking device is typically located near a suitcase tracking device, the tracking system 100 may prompt the user to add the toiletry bag tracking device to a travel tracking device collection.

In some embodiments, the tracking system 100 can notify the user that a car tracking device is potentially stolen based on the behavior of the car tracking device. For example, if the car tracking device is typically parked within a threshold distance of a geographic location during particular hours (e.g. while the user is typically home or asleep), the tracking system 100 may notify the user if the car tracking device is not located within that threshold distance. The tracking system may also determine that a keys tracking device is typically located near the car tracking device when the car tracking device is moving, and may notify the user that the car tracking device is potentially stolen if the car tracking device is moving when not near the keys tracking device.

In some embodiments, the tracking system 100 can notify the user that a car coupled to a tracking device has been in a car accident. The tracking system 100 may determine if the car tracking device stops suddenly or begins to move erratically and may identify that behavior as indicative of a car accident. The tracking system 100 may send a notification to the user about the potential car accident, and the notification may include an option to automatically send emergency assistance (e.g. an EMT, paramedic, fire fighters, the police) to the location of the car tracking device. If the mobile device is not located near the car tracking device, the notification may include the location of the car tracking device. If the mobile device is located near the car tracking device (e.g. within a threshold distance), the tracking system 100 may automatically notify an emergency assistance service (e.g. 911) of the car accident and may transmit the location of the car tracking device or the mobile device to the emergency assistance service.

In some embodiments, the tracking system 100 can notify the user with an estimate for how long it will take for the user's luggage to arrive at the luggage carousel from an airplane. The tracking system 100 may analyze the amount of time it takes luggage tracking devices of other users to arrive at the luggage carousel and provide an estimate based on those amounts of time. In some embodiments, the tracking system 100 determines an estimate for the amount of time will take for a luggage tracking device to arrive at the luggage carousel based on which airport the user has arrived at. The tracking system 100 may also analyze the paths luggage tracking devices take in an airport from an airplane to a luggage carousel and, based on those paths, provide a real-time time estimate to the user. For example, if the average wait time is 30 minutes and the luggage tracking device is half way to the luggage carousel from the airplane, the tracking system 100 may update the wait time estimate to 15 minutes.

In some embodiments, the tracking system 100 notifies the user if a tracking device typically does not move and the tracking device suddenly begins to move. For example, a tracking device may be coupled to an object that typically does not move, such as a piece of art, a safe, an unused car, a desktop computer, a passport, or a file cabinet. If the tracking device moves (e.g. is located in a location different from where it was originally, or a motion-detection sensor of the tracking device, such as an accelerometer, detects movement), the tracking system 100 may notify the user that the tracking device is potentially lost or stolen. In some embodiments, the tracking system 100 only notifies the user that the tracking device has moved if the mobile device is not located within a threshold distance of the tracking device.

In some embodiments, the tracking system 100 notifies the user if a pet coupled to a pet tracking device is taken for a walk. The tracking system 100 may determine if a pet is being taken out for a walk if the pet tracking device is following a path that the pet tracking device follows regularly (e.g. weekly, when a pet walker comes to walk the pet). If the pet tracking device deviates from paths the pet tracking device has taken in the past, the tracking system 100 may notify the user that the pet is potentially lost rather than that the pet is on a walk. Additionally, if the tracking system 100 determines that the pet is on a walk but that the path taken by the pet tracking device is different from a typical path of a walk (e.g. significantly longer or shorter), the tracking system 100 may provide a notification describing the difference to the user.

User Behavior:

The tracking system 100 can identify a tracking device 106 as potentially lost in response to a comparison of current user location and behavior and historical user location and behavior. For instance, the tracking system 100 can determine that a user commonly brings a tracking device 106 with the user during particular times of the day (determined, for instance, based on historical communicative connections between the tracking device and a mobile device 102 of the user). In such instances, if the user is determined to not have the tracking device 106 during similar times of the day, the tracking system 100 can flag the tracking device as potentially lost. Likewise, the tracking system 100 can determine that when a mobile device 102 of a user is historically communicatively connected to a first tracking device in a collection of tracking devices, the user is historically commonly connected to the remaining tracking devices in the collection of tracking devices. In such instances, if the user's mobile device 102 is communicatively connected to the first tracking device in the collection but not the second tracking device in the collection, the tracking system 100 can flag the second tracking device as potentially lost.

The tracking system 100 can predict a state of a tracking device 106 based on historical user location and behavior. For instance, the tracking system 100 can determine that users commonly bring a particular type of object coupled to a tracking device when the users move from a first location to a second location. In such instances, the tracking system 100 can determine that the user of a tracking device 106 coupled to the particular type of object is in the first location, and can predict that the user will want to bring the object to the second location. Likewise, the tracking system 100 can determine that a user commonly drives a particular vehicle on weekend mornings, and can predict that the user will need to bring the user's wallet coupled to a tracking device 106 before the user drives the vehicle.

Figure 8:
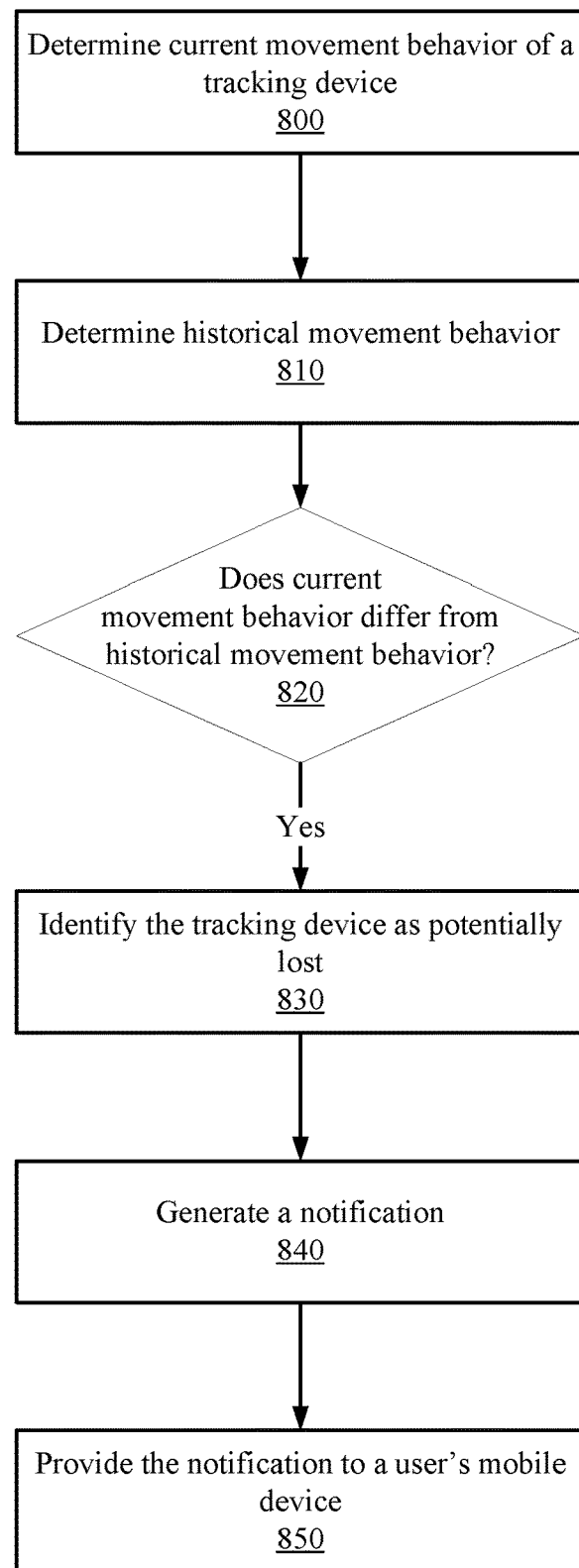
FIG. 8 illustrates a flowchart for a method of identifying a tracking device as potentially lost based on historical movement behavior, according to one embodiment.

FIG. 8 illustrates a flowchart for a method of identifying a tracking device as potentially lost based on historical movement behavior, according to one embodiment. Alternate embodiments may contain more, fewer, or different steps, or the steps may be performed in an order different from the one shown in FIG. 8.

The tracking system 100 determines 800 a current movement behavior of a user's tracking device, and determines 810 a historical movement behavior. The historical movement behavior can be historical movement behavior of the tracking device, the user, or the user's mobile device. It should also be noted that in some embodiments, the tracking system 100 can determine a current movement behavior of a user, or of a user's mobile device. The tracking system 100 determines if the current movement behavior differs from the historical movement behavior. If the current movement behavior differs from the historical movement behavior (e.g. by more than a threshold amount), the tracking system identifies 830 the tracking device as potentially lost. The tracking system 100 generates 730 a notification identifying the tracking device and indicating that the tracking device is potentially lost, and provides 740 the generated notification to the user's mobile device. The user's mobile device can be configured to display the notification to the user.

Examples

In some embodiments, the tracking system 100 notifies the user if the user has potentially dropped a tracking device. For example, if the tracking system 100 detects that the user may have dropped a tracking device coupled to the user's keys or wallet, the tracking system 100 may notify the user that the tracking device was potentially dropped and provide the location of the tracking device to the user in the notification. The tracking system 100 may detect a dropped tracking device if the tracking device is moving similarly to and in conjunction with the mobile device and the tracking device stops moving while the mobile device keeps moving, or the movement of the tracking device differs by more than a threshold from the movement of the mobile device. In some embodiments, the tracking system 100 provides notifications to the user based on the user's routine. If the user regularly visits a location during a particular time period and brings one or more tracking devices while visiting the location, the tracking system 100 may provide notifications to the user that remind the user to bring the tracking devices or notify the user that they potentially forgot to bring one or more of the tracking devices. For example, if the user visits a gym every week, the tracking system 100 may provide notifications to the user to bring gym tracking devices (e.g. a gym shoes tracking device or a gym bag tracking device) to the gym. Similarly, if the user travels regularly, the tracking system 100 may notify the user to bring travel tracking devices (e.g. a passport tracking device or a luggage tracking device) before the user travels to the airport. If the user is a student and goes to class regularly, the tracking system 100 can provide a notification to bring tracking devices coupled to class supplies (e.g. textbooks, a laptop, pencil case, notebook, homework/homework folder), or may notify the user if the user has potentially forgotten a class supply tracking device. In some embodiments, the user can specify routine activities for which the tracking system 100 should provide notifications or can specify time ranges during which the tracking system 100 should provide notifications. For example, if the user goes to the gym on Tuesdays, the user may specify to the tracking system 100 to provide reminder notifications about gym tracking devices on Tuesdays or when the user is going to or at the gym.

In some embodiments, the tracking system 100 can provide reminder notifications to the user to use objects that the user needs to interact with regularly. The tracking system 100 may determine if the user is near a tracking device coupled to one of the objects and, if the user has not been near the tracking device within a certain time period, the tracking system 100 may notify the user to use the object coupled to the tracking device. For example, the user may be notified to use a pill box/medicine, a toothbrush, a mouth guard, or weights/exercise equipment. In some embodiments, the tracking device is coupled to an object that is related to a chore the user needs to perform on a regular basis, such as a pet food bowl, a mailbox, a washer/dryer, a dishwasher, a sink, or a trash can.

External Data:

The tracking system 100 can identify a tracking device 106 as potentially lost or can predict a state of the tracking device based on data received from an external data source 112. The external data source 112 can be an external database, a website, a digital or network service, an external device or system, a communication, or any other suitable source. In some embodiments, data can be requested from the external data source 112 by the tracking system 100 or a mobile device 102, for instance via an API associated with the external source. The data can be requested from the external data source 112 at the explicit request of a user of the mobile device 102, periodically, or in response to the occurrence of an event (for instance, the movement of a tracking device 106, the communicative coupling of the tracking device to the mobile device, locating the tracking device, the movement or location of the user, or any other suitable criteria).

Figure 9:
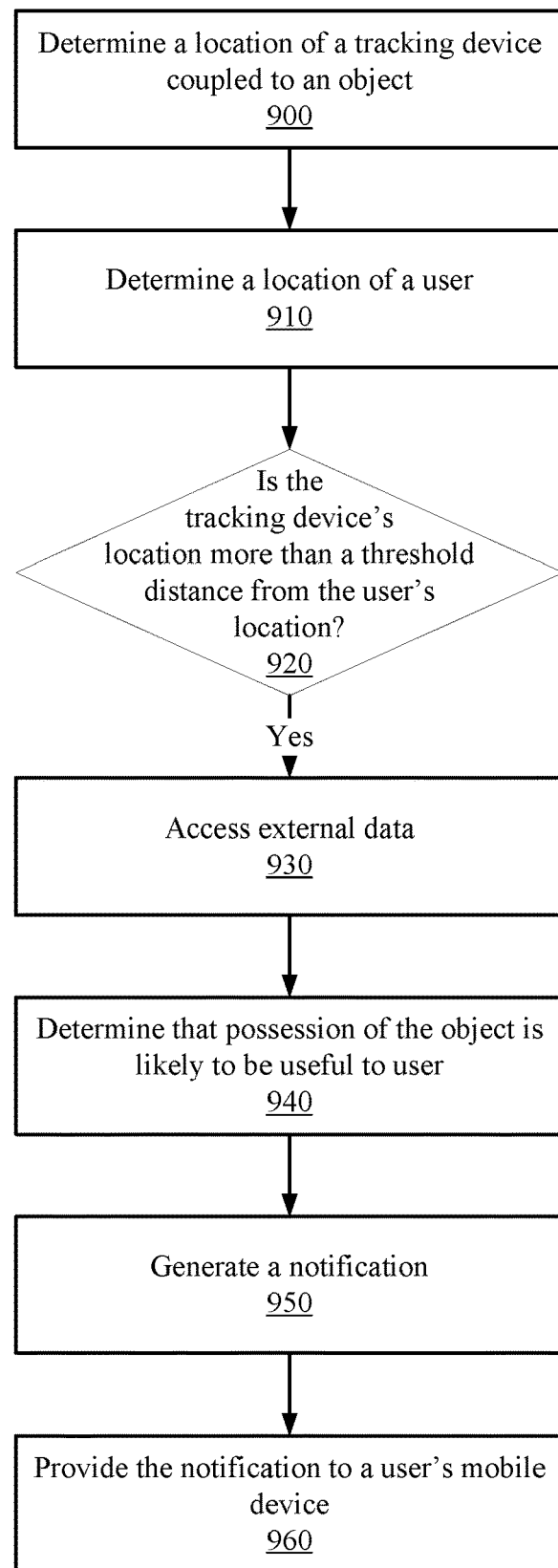
FIG. 9 illustrates a flowchart for a method of identifying a tracking device as potentially useful to user based on external data, according to one embodiment.

FIG. 9 illustrates a flowchart for a method of identifying a tracking device as potentially useful to user based on external data, according to one embodiment. Alternate embodiments may contain more, fewer, or different steps, or the steps may be performed in an order different from the one shown in FIG. 9.

The tracking system 100 determines 900 a location of a user's tracking device, where the tracking device is coupled to an object. The tracking system 100 determines 910 a location of a user, and determines 920 whether the tracking device location is more than a threshold distance from the user's location. If the tracking device location is more than the threshold distance from the user location, the tracking system 100 accesses 930 external data from an external source, where the external data is associated with the object coupled to the tracking device. The tracking system 100 determines 940 that possession of the object is likely to be useful to the user based on the external data. The tracking system 100 generates 950 a notification identifying the tracking device and recommending that the user obtain the object, and provides 960 the generated notification to the user's mobile device. The user's mobile device can be configured to display the notification to the user.

Examples

In some embodiments, the tracking system 100 receives financial transaction information from a bank or a budgeting system to detect fraudulent charges to the user's account. The tracking system 100 may receive information identifying transactions charged to the user's credit card and identifying where the transactions occurred. If a transaction occurred at a store that the wallet tracking device has not been in or was not in at the time of the transaction, the tracking system 100 may notify the user that the transaction at the store is potentially fraudulent. In some embodiments, the notification of the potential fraudulent charge may include an option to notify the credit card company of the fraudulent charge.

In some embodiments, the tracking system 100 receives sales information from a vendor system regarding sales that are available near the user based on tracking devices near the user. If the tracking system 100 detects that a tracking device is near the user (e.g. within a threshold distance of the mobile device), and the tracking device is coupled to an object, the tracking system 100 may provide a notification with information about a sale that is relevant to the object. For example, if the user is carrying a gym bag tracking device and is walking through a store, the tracking system 100 may notify the user that there is a sale on energy drinks or water. In some embodiments, the tracking system 100 provides notifications with sales information based on a tracking device not being located near the user. For example, if the user is carrying a luggage tracking device, but a toiletry bag tracking device is not located near the user, the tracking system 100 may notify the user of sales to purchase toiletries in a nearby store.

In some embodiments, the tracking system 100 receives parking regulation information from a database. The parking regulation information may describe where a user can park a car and for how long the user can park the car there. The tracking system 100 can provide notifications to a user if the user has parked their car in a spot for too long. For example, if a car tracking device is located in a parking spot that has a two-hour parking limit, the user may be notified after an hour and a half that the car tracking device needs to be moved soon. If the user paid a parking meter for the parking spot, the tracking system 100 may provide a notification to the user when the parking meter timer is getting low, and the notification may include an option to pay more money into the parking meter. In some embodiments, the tracking system 100 determines which parking meter is associated with the car tracking device based on the location of the car tracking device. Additionally, the tracking system 100 may notify the user if the car tracking device is potentially parked in a parking spot that the car is not allowed to be parked in. For example, if street parking on a street is restricted on Mondays and the car tracking device is located on the restricted street on a Monday, the user may be notified that their car is potentially parked illegally.

In some embodiments, the tracking system 100 receives information about a user's schedule and provides notifications to the user based on the user's schedule. The schedule information can include information about a user's calendar from a calendaring system or a user's messages (e.g. emails, texts, instant messages) from a messaging system. The schedule information may describe events the user must attend, including what the events are, when they are, and where they are. The tracking system 100 may provide notifications to the user to remind the user to bring certain tracking devices to an event or to notify the user that they potentially left a tracking device behind. For example, the tracking system 100 may remind the user to bring a wallet tracking device, a keys tracking device, a watch tracking device, or a glasses tracking device to events on the user's schedule. In some embodiments, the tracking system 100 provides a notification to the user based on what event is on the user's schedule. For example, if the schedule information shows that the user is going to class and does not have a class tracking device (e.g. a textbook tracking device, pencil case tracking device, notebook tracking device), the tracking system 100 may notify the user that they potentially forgot the class tracking device. In some embodiments, the schedule information includes the type of the class (e.g., Biology, English, History) the user needs to attend, and the tracking system 100 may identify the class tracking device as potentially lost based on the type of the class.

In some embodiments, the tracking system 100 receives travel information for the user from a travel agency or a transport service and provides notifications based on the travel information. The travel information can include the user's start location, destination, departure time, arrival time, or transportation hubs the user may be traveling through. In some embodiments, the travel information is determined based on the user's emails or calendar received by the tracking system 100. The tracking system 100 may provide a notification to the user to pack certain objects based on the user's destination. For example, if the user is traveling to a cold place and a jacket tracking device is not located near a luggage tracking device, the tracking system 100 may notify the user that they should pack a jacket. The tracking system 100 can notify the user that their luggage is potentially lost if a luggage tracking device is not located at the correct transportation hub (determined based on information received from a travel system) when the user arrives at the transportation hub. For example, if a luggage tracking device is located at an airport that is different from the one the user arrived at, the user may be notified that the luggage tracking device is at the wrong airport.

In some embodiments, the tracking system 100 can notify a travel hub or a transportation service if a user's luggage takes a long time to reach a luggage carousel or if the user's luggage was lost. The tracking system 100 can determine if a user's luggage took a long time to reach a luggage carousel or if the user's luggage was lost based on the location of a luggage tracking device. If the tracking system 100 notifies the travel hub or transportation service about delayed or lost luggage, the tracking system 100 may receive a coupon, gift card, offer, or the like for the user from the travel hub or transportation service. For example, the travel hub or transportation service may provide the user with an offer for a free coffee or a discount on a future trip.

In some embodiments, the tracking system 100 receives weather information from a weather service and can provide notifications to the user based on the weather information. The weather information includes information about the weather in a geographic area, including high and low temperatures, rain/snow forecasts, wind forecasts, or humidity forecasts. The tracking system 100 may provide notifications to the user if the user is not located near a tracking device coupled to an object that will be necessary or helpful for the forecasted weather in the weather information. For example, if the weather information forecasts rain in the user's geographic area and a jacket tracking device is not located near the user, the tracking system 100 may notify the user that it will rain soon and that the user does not have their jacket. The user may receive a similar notification if the user is not located near an umbrella tracking device, a rain boot tracking device, or a hat tracking device. Similarly, if the weather information forecasts snow in the user's geographic area, the tracking system 100 may provide the user with a notification reminding them to bring a coat tracking device, an ear muff tracking device, or a scarf tracking device. If the weather information forecasts warm weather in the user's geographic area, the tracking system 100 may provide the user with a notification reminding them to bring a water bottle tracking device, a sunscreen tracking device.

In some embodiments, the tracking system 100 receives information about natural disasters or emergency situations near the user and may notify the user of the locations of tracking devices coupled to emergency supplies. Examples of natural disasters can include flooding, hurricanes, tornados, earthquakes, and forest fires. Examples of emergency situations can include power outages, water outages, police activity, and building fires. The tracking system 100 can notify a user of the location of tracking supplies coupled to emergency supplies, including a fire extinguisher, extra water, extra food, and flashlights. In some embodiments, the tracking system 100 notifies the user of the location of a tracking device coupled to an object carried by the user's child if the tracking system receives information about a natural disaster or emergency situation.

Sensor Data:

The tracking system 100 can identify a tracking device 106 as potentially lost or can predict a state of the tracking device based on data received from one or more tracking device sensors. The tracking device sensors can include one or more of: movement sensors (such as accelerators, gyroscopes, and the like), location determination sensors (such as a GPS transceiver, altimeters, and the like), orientation sensors, proximity sensors, communication sensors (such as a Bluetooth antenna or a Wifi antenna), temperature sensors, pressure sensors, light sensors, touch sensors (such as a capacitive touch screen), audio sensors (such as a microphone), or any other suitable sensor. The tracking device 106 can obtain sensor data in response to requesting sensor data from the sensors, automatically (as the sensors receive/generate the data), in response to a request from a mobile device 102 or a user of the mobile device, in response to a request from the tracking system 100, and the like. The tracking device 106 can forward the sensor data to a mobile device 102, which in turn can forward the sensor data to the tracking system 100.

The tracking system 100 can identify a tracking device 106 as potentially lost based on sensor data received from the tracking device. For instance, if a user leaves the tracking device 106 at home, and sensor data is received from the tracking device indicating that the tracking device has moved, the tracking system 100 can identify the tracking device as potentially lost (or in this case, potentially stolen). Likewise, if sensor data is received from a first tracking device indicating that a temperature has fallen below a particular threshold, the tracking system can predict that a user might need an object coupled to a second tracking device in order to stay warm.

Figure 10:
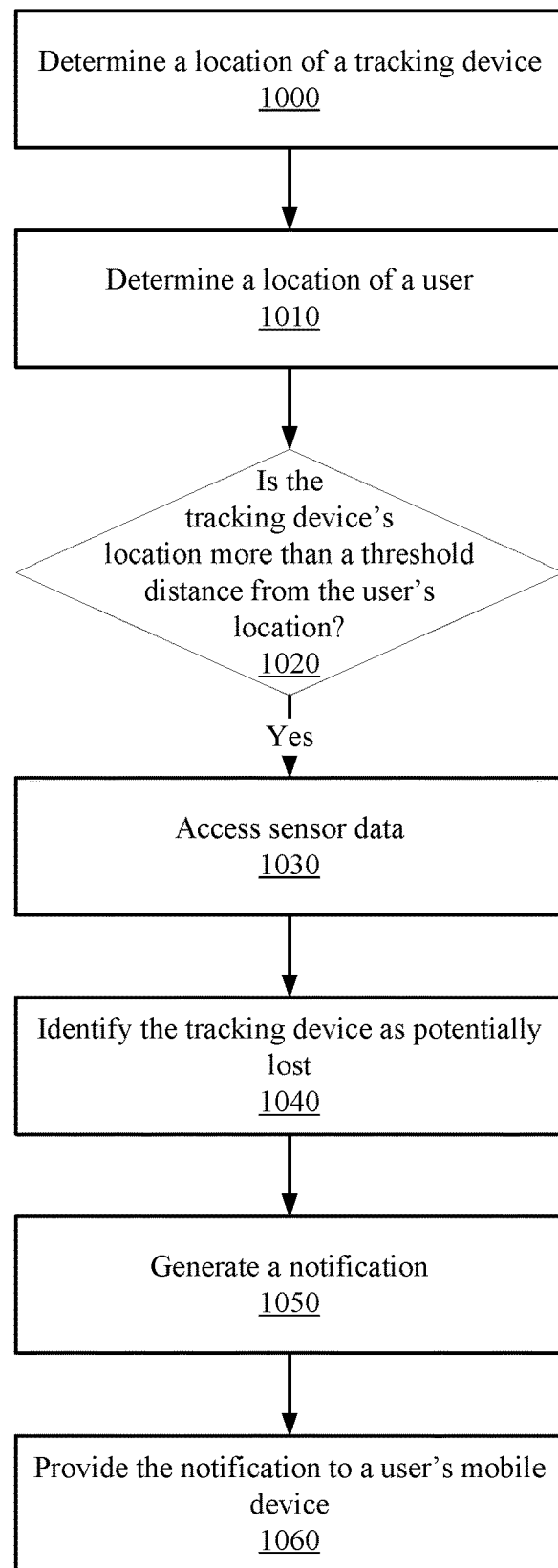
FIG. 10 illustrates a flowchart for a method of identifying a tracking device as potentially lost based on sensor data, according to one embodiment.

FIG. 10 illustrates a flowchart for a method of identifying a tracking device as potentially lost based on sensor data, according to one embodiment. Alternate embodiments may contain more, fewer, or different steps, or the steps may be performed in an order different from the one shown in FIG. 10.

The tracking system 100 determines 1000 a location of a user's tracking device that is coupled to an object. The tracking system 100 determines 1010 a location of a user, and determines 1020 whether the tracking device location is more than a threshold distance from the user's location. If the tracking device location is more than the threshold distance from the user location, the tracking system 100 accesses 1030 sensor data from one or more sensors within the tracking device. The tracking system 100 identifies 1040 identifies the tracking device as potentially lost based on the sensor data. The tracking system 100 generates 1050 a notification identifying the tracking device and identifying the tracking device as potentially lost, and provides 1060 the generated notification to the user's mobile device. The user's mobile device can be configured to display the notification to the user. Examples: In some embodiments, the tracking system 100 uses accelerometer data from an accelerometer in a tracking device to determine if the user has dropped the tracking device and may identify the tracking device as potentially lost. For example, if the accelerometer data describes a sudden downward acceleration of the tracking device and then a sudden deceleration as the tracking device reaches the ground, the tracking system 100 may notify the user that the user potentially dropped the tracking device. In some embodiments, the tracking system 100 only notifies the user that the tracking device is potentially lost if the tracking device is not located within a threshold distance of the user.

In some embodiments, the tracking system 100 uses thermometer data from a thermometer in a tracking device to notify a user if an area is too warm or too cold for an object coupled to the tracking device or if the tracking device is outside when it should not be. The tracking system 100 may notify the user that the tracking device is potentially lost or that the tracking device is outside. For example, if the user leaves their pet outside on a cold day and thermometer data from a pet tracking device indicates that the temperature is below a threshold, the tracking system 100 may notify the user that it is potentially too cold outside for the pet. Similarly, if the user leaves a laptop tracking device outside, the tracking system 100 may notify the user that the laptop is potentially lost based on thermometer data from the tracking device that it is warm. Such a tracking device can be coupled to a laptop, a child, a pet, a book, a wallet, keys, or any other object a user may leave outside.

In some embodiments, the tracking system 100 uses altimeter data from an altimeter in a water bottle tracking device to notify the user to drink water to keep hydrated. If the tracking system 100 determines that the water bottle tracking device is located near the user, and the altimeter data from the water bottle tracking device indicates that the water bottle tracking device is at a high altitude, the tracking system 100 may provide a notification to the user to drink from the water bottle to keep hydrated. Similarly, if the user is at a high altitude and a water bottle tracking device is not located near the user, the user may be notified that the water bottle tracking device is lost or that the water bottle tracking device should be brought with the user when the user goes outside. If the user is at a high altitude, the tracking system 100 also may notify the user to use or find a tracking device coupled to sunscreen, a hat, a jacket, a backpack, sunglasses, or any other object that may be helpful in a high-altitude environment. In some embodiments, the tracking system uses thermometer data from a thermometer in the water bottle tracking device to notify the user to drink water.

In some embodiments, the tracking system 100 receives barometer data from a barometer in a tracking device to determine if it is about to rain. If the barometer data indicates that it is about to rain (e.g. the barometric pressure begins to drop) and a rain-gear tracking device (e.g. a jacket tracking device) is not located near the user, the tracking system 100 may notify the user that the rain-gear tracking device is lost or that the user should bring the rain-gear tracking device when going outside.

In some embodiments, the tracking system 100 uses audio data from an audio sensor in a tracking device to determine if an object coupled to the tracking device is potentially being stolen. If the audio data from a tracking device indicates that a window or a door has been broken, the tracking system 100 may notify the user that someone may be breaking into their house and may identify the tracking device as potentially lost. The tracking system 100 also may use accelerometer data to determine if a tracking device coupled to an object has been stolen. For example, if audio data indicates that a window has been broken and/or accelerometer data indicates that the tracking device is moving, the tracking system 100 may notify the user that the tracking device has potentially been stolen and may identify the tracking device as potentially lost.

It should be emphasized that in some embodiments, identifying a tracking device as lost or predicting a state of a tracking device can be based on any combination of the above circumstances. For example, a tracking device can be identified as potentially lost based on a proximity of the tracking device to other tracking devices and based on historical behavior of the tracking device. Likewise, a state of the tracking device can be predicted based on a combination of a movement of the tracking device and based on sensor data received from the tracking device.

Examples

In some embodiments, the tracking system 100 uses audio data from an audio sensor in a tracking device and the tracking device's proximity to a geographic location to notify the user that the tracking device has potentially been stolen. If the audio data from a tracking device indicates that a window or a door has been broken, and the tracking device is not located within a threshold distance of a geographic location or within certain geographic boundaries (e.g. a user's home), the tracking system 100 may notify the user that the tracking device has potentially been stolen.

In some embodiments, the tracking system 100 can notify the user of potential fraudulent financial transaction based on the behavior of a wallet tracking device. The tracking system 100 can receive financial transaction information from a bank or a budgeting system. If the financial transaction information describes a financial transaction at a store, but the historical behavior of the wallet tracking device suggests that the user has not been in the store, the tracking system 100 may notify the user of the potentially fraudulent financial transaction. For example, if the financial transaction information includes a credit card charge at a first restaurant on a Wednesday, however the wallet tracking device is typically located in another restaurant on Wednesdays, the tracking system 100 may notify the user of the potentially fraudulent charge at the first restaurant.

The tracking device system 100 can prompt a user of a mobile device 102 to opt-in to one or more types of interventions, for instance via a mobile device interface. For example, the tracking system 100 can determine that a tracking device 106 is part of a tracking device collection, and can suggest to a user of a mobile device 102 that the mobile device receive intervention notifications when the distance between the tracking device and other tracking devices in the tracking device collection exceeds a threshold. If the user opts-in to a suggested intervention, the tracking system 100 stores the opt-in and provides notifications associated with the intervention in response to the circumstances associated with the intervention being trigger. If the user does not opt-in to a suggestion intervention, the tracking system 100 will not provide notifications associated with the intervention, even if the circumstances associated with the intervention are triggered.

Figure 11:
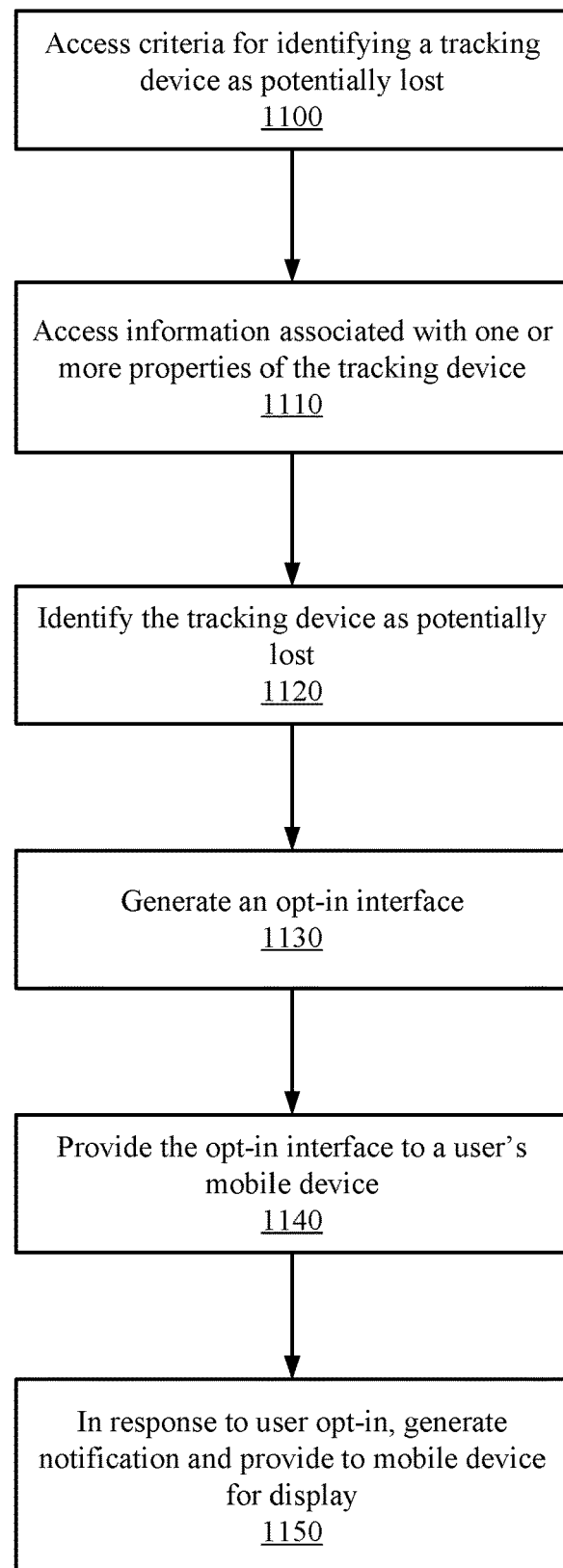
FIG. 11 illustrates a flowchart for a method of generating an opt-in notification for identifying a tracking device as potentially lost, according to one embodiment.

FIG. 11 illustrates a flowchart for a method of generating an opt-in notification for identifying a tracking device as potentially lost, according to one embodiment. Alternate embodiments may contain more, fewer, or different steps, or the steps may be performed in an order different from the one shown in FIG. 11.

The tracking system 100 accesses 1100 criteria for identifying a user's tracking device as potentially lost. The criteria can be associated with one or more properties of the tracking device. The tracking system 100 accesses 1110 information associated with the one or more properties of the tracking device, and identifies 1120 the tracking device as potentially lost based on the accessed criteria and the accessed information associated with the one or more properties of the tracking device. The tracking system 100 generates 1130 an interface including an option to opt-in to notifications identifying the tracking device as potentially lost in response to the accessed criteria being satisfied, and provides 1140 the generated interface to the user's mobile device. The mobile device can be configured to display the interface to the user. In response to the user opting-in to receiving the notifications, the tracking system 100 generates 1150 a notification that the tracking device is potentially lost and provides the generated notification to the mobile device for display to the user.

In some embodiments, the tracking system 100 can prompt a user of a mobile device 102, via a notification presented by the mobile device, to configure a tracking device 106 to operate in a particular mode based on a predicted state of the tracking device. For instance, if a tracking device 106 is predicted to be in motion or is predicted to move to an unfamiliar location, the tracking system 100 can instruct the mobile device 102 to display a notification including an option to configure the tracking device to operate in a high performance mode (e.g., the tracking device can increase a frequency of advertisements/communications broadcasted by the tracking device to increase the likelihood that the tracking device is able to communicatively couple to the mobile device or a community mobile device 104). Likewise, if a tracking device 106 is predicted to be stationary for an interval of time, the tracking system 100 can instruct the mobile device 102 to display a notification including an option to configure the tracking device to operate in a power saving mode (e.g., the tracking device can decrease the frequency of advertisements/communications broadcasted by the tracking device in order to preserve power).

If the user selects to reconfigure the tracking device 106 to operate in a particular mode as suggested by the notification (for instance, by selecting a selectable option displayed by the notification), the mobile device 102 can reconfigure the tracking device, and can inform the tracking system 100 that the user reconfigured the tracking device. In the future, if the tracking system 100 predicts a similar tracking device state, the tracking system can instruct the mobile device 102 to similarly configure the tracking device 106 without requiring the mobile device to display a similar notification and without requiring the user to affirmatively select to configure the tracking device to operate in the suggested mode.

Examples

In some embodiments, the tracking system 100 prompts the user to opt into notifications about a luggage tracking device if the tracking system 100 determines the user is traveling. The user can select to receive notifications about whether the luggage tracking device is on the correct airplane, whether the luggage tracking device arrived at the correct airport, or an estimate for how long it will take for the luggage tracking device to arrive at a luggage carousel.

In some embodiments, the tracking system 100 prompts the user to opt into or modify the circumstances under which the user is notified when a tracking device is not located within a threshold distance of the mobile device. For example, if the user leaves a wallet tracking device or a keys tracking device on a desk in the user's office and the user leaves the office without bringing the wallet tracking device or the keys tracking device, the user may not want a notification while the user is still within the office building. Thus, the tracking system 100 may prompt the user to adjust the threshold distance for which lost determinations are made for one or more tracking devices. Additionally, if the user does not want to receive notifications about a tracking device not being located within a threshold distance of the user, the user may be prompted to disable the notifications regarding that tracking device. For example, if a user lends their car to other people, the user may disable notifications about a car tracking device.

In some embodiments, the tracking system 100 prompts the user to configure a tracking device to operate in a particular mode. For example, the user may configure a tracking device to operate in a power saving mode if the tracking device is coupled to an object that is predicted to be stationary for a period of time, such as a safe, artwork, a desktop computer, a jewelry box, or a television. The user may also configure a tracking device to operate in a power saving mode if the tracking device is coupled to an object (such as a television remote, a pet, or weights/exercise equipment) that is predicted to be located within a geographic area, such as a home, an office, or a store. The user may configure a tracking device to operate in a high-performance mode if the tracking device is coupled to an object that is predicted be in an unknown/unfamiliar area or is predicted to move, such as a car, luggage, a wallet, or keys. In some embodiments, the user may configure a tracking device to operate in different modes based on where the tracking device is located. For example, a pet tracking device may operate in a power saving mode when the pet tracking device is located within a home and may operate in a high-performance mode if the tracking device is located outside the home.

The tracking device interventions described herein can beneficially enable a user to know that a tracking device is lost before the user even realizes the tracking device is lost. Likewise, a tracking device intervention can remind a user to bring an object coupled to a tracking device with the user when the user moves from a first location to a second location (e.g., on the way to work) before the user gets too far away from the first location. In addition, a tracking device intervention can suggest a user take an action (such as bringing an object coupled to a tracking device) based on a predicted state of the tracking device (e.g., the object coupled to the tracking device is likely to be useful to the user). In each of these circumstances, the user is provided with important or useful information before the user realizes that such information would be important or useful, thereby beneficially improving a user's experience with the tracking device and the tracking system 100.

Tracking Device Functions Based on User Presence

Figure 12A:
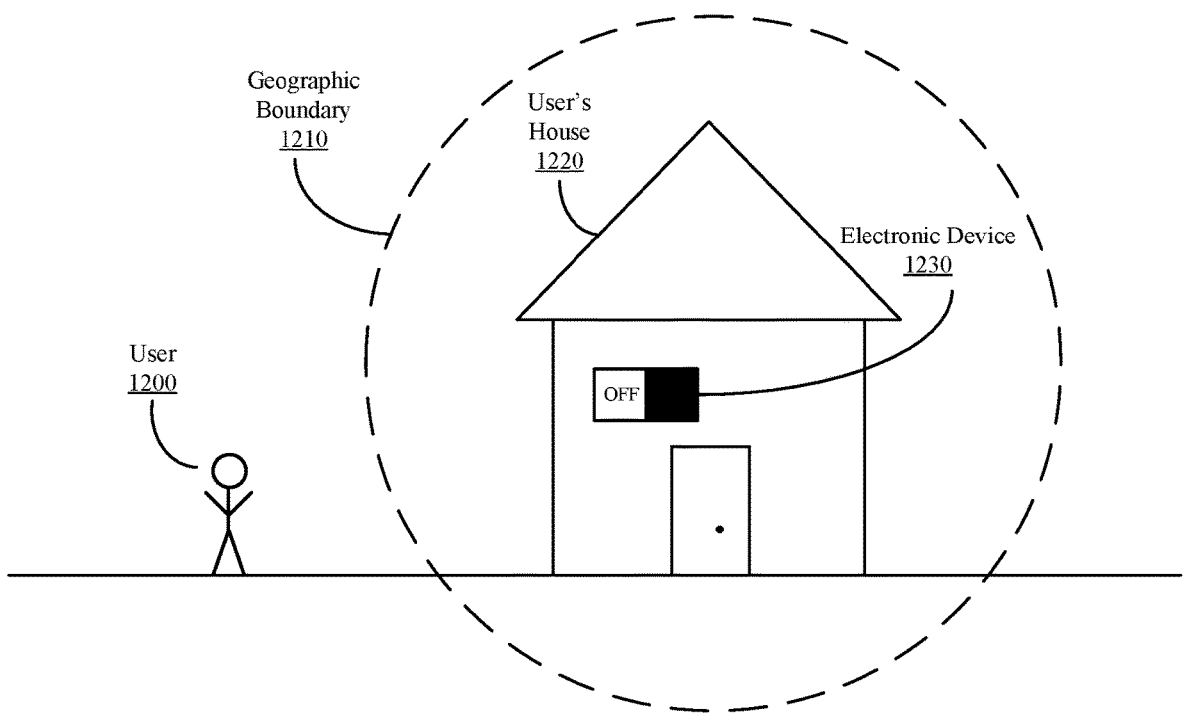
FIGS. 12A and 12B illustrate an example of configuring an electronic device based on the entry of a user into an area defined by a geographic boundary, according to one embodiment.
Figure 12B:
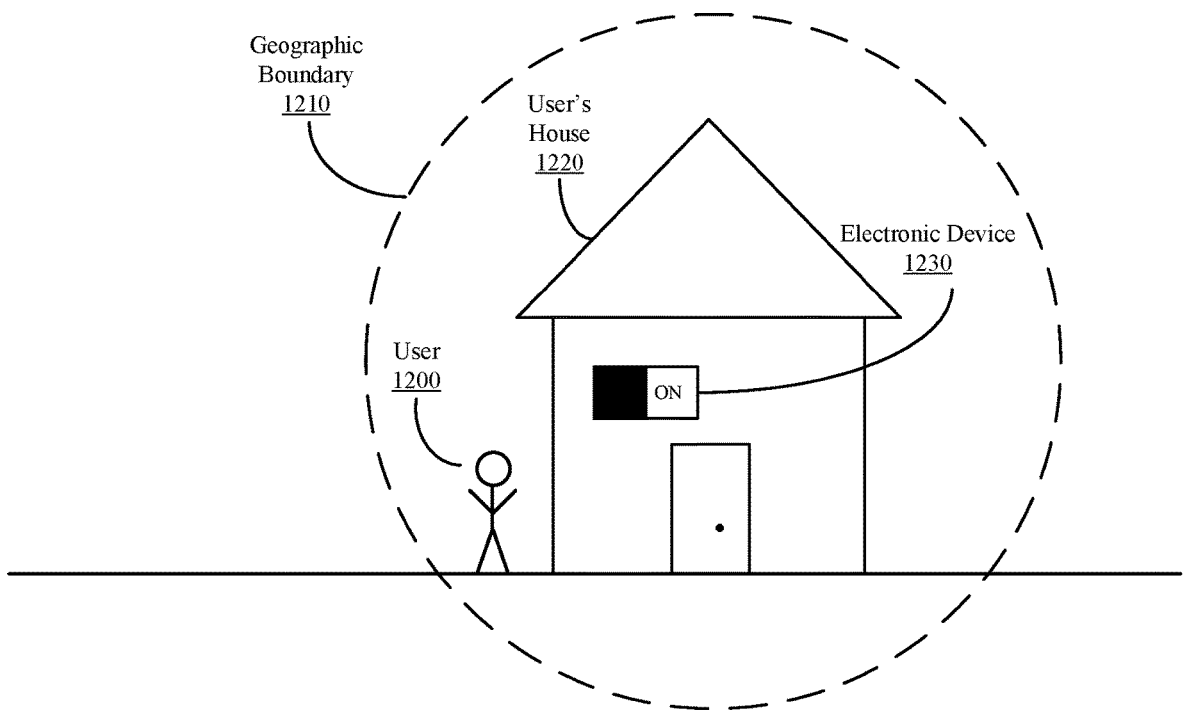

A user's location, or a user's presence within a geofence or other predefined area, can be used to configure the operating mode or state of an electronic device. For instance, the movement of a user into a geographic area can be used to configure an electronic device within the area. Examples of such devices include home security systems, home heating and cooling systems, door locks, computers, routers, television set-top boxes, scanning devices (such as tracking device scanning devices), Bluetooth devices, and the like. FIGS. 12A and 12B illustrate an example of configuring an electronic device based on the entry of a user into an area defined by a geographic boundary, according to one embodiment. In particular, FIG. 12A illustrates a user 1200 outside an area defined by a geographic boundary 1210, and FIG. 12B illustrates the entry of the user into the geographic boundary. In this example, the geographic boundary 1210 encloses an area that contains the user's house 1220. When the user 1200 is outside of the geographic boundary 1210, an electronic device 1230 is configured to operate in a first mode. In the embodiment of FIG. 12A, the first mode is an "off" mode, but in other embodiments, the first mode can be an "on mode", an "active mode" (e.g., for a security system), a temperature range (e.g., "between 60 and 65 degrees Fahrenheit"), or any other suitable mode of operation. When the user 1200 enters the geographic boundary 1210, as illustrated in FIG. 12B, the electronic device 1230 is configured to operate in a second mode (such as the "on" mode) in response to the presence of the user within the geographic boundary.

In order to detect the absence or presence of a user 1200 within an area, a tracking system, such as the tracking system 100, can detect the absence or presence of a tracking device often carried by or within a threshold distance of the user (for instance, a tracking device coupled to the user's keys, a handbag or backpack of the user, or the user's vehicle). As described above, a mobile device (such as a smartphone) of the user can receive a transmission from the tracking device and, in response, can detect a location of the mobile device (for instance, using location-detection functionality, such as a GPS receiver). The mobile device can then provide the detected location and an identity of the tracking device to the tracking system, and the tracking system can determine the presence or absence of the user based on the provided location and tracking device identity.

The geographic boundary 1210 encloses a pre-defined geographic area. In one embodiment, the user defines the geographic boundary 1210, for instance, by selecting a center of the boundary, a shape of the boundary, a radius of the boundary, the location for each boundary segment, and the like. For instance, a user can define a geographic boundary centered on the user's workplace and can specify that the geographic boundary covers the campus of the workplace. A user can also define the operating mode/function of a device being configured based on the presence or absence of the user in the geographic boundary. For instance, a user can define a geographic boundary, identify a device, define a first operating mode of the device when the user is within the geographic boundary, and define a second operating mode of the device when the user is outside the geographic boundary.

In addition to the tracking system 100 configuring a device based on a user's absence/presence, a device can configure itself when it detects a user or a tracking device associated with the user, based on the user's observed daily routine. In an embodiment, the tracking system 100 can determine the geographic boundary 1210 based on the observed behavior and location of the user 1200 without direct input from the user. For example, the tracking system 100 can define geographic boundaries centered on the home of a first and second user, based on behavior of the first and second user each day after school. Continuing with this example, the first user can return directly home most days after school, and thus the tracking system can define a first geographic boundary of a first radius covering the property on which the home sits. Likewise, the second user can often go to a neighbor's house to study, and the tracking system can define a second geographic boundary of a second radius larger than the first radius for the second user to cover not just the property on which the house sits but to cover the neighbor's house as well. Accordingly, when either the first user returns home or the second user goes to the neighbor's house on a particular day, a furnace within the home can be activated in order to begin heating the home, as the tracking system 100 may observe the first user or second user doing routinely.

The geographic boundary 1210 may be associated with a time range. In some embodiments, a user can define a geographic boundary and can define a time range in which the geographic boundary is active. For example, a user can define a geographic boundary associated with the user's home for the hours of 5 pm to 7 pm (when the user generally arrives home from work), and the tracking system 100, in response to detecting the user arriving within the geographic boundary within the time range, can configure the operating mode of one or more electronic devices or home systems. In some embodiments, the tracking system 100 can define a geographic boundary without user input based on a user's historical behavior and can define the geographic boundary to be active only during a time period associated with the user's historical behavior.

In some embodiments, a user 1200 may define multiple geographic boundaries 1210, each associated with a different electronic device. For example, a user can define a first geographic boundary associated with a furnace of her house and can define a second, smaller geographic boundary associated with a security system of her house. Accordingly, because furnaces take some time to heat up a house, the furnace turns on as soon as the user crosses the first geographic boundary, and the security system is only de-activated when the user crosses the second, smaller geographic boundary. Such an embodiment both enables the furnace more time to heat the house, and reduces the period of time during which the security system is de-activated.

A device can also configure itself when the user exits the region bounded by a geographic boundary. For example, because a user does not need a heated house when they are not home, the furnace may turn itself off when the user is not at their house. Therefore, the furnace can be configured to turn off if the user is exiting the geographic boundary instead of turning on when the user enters the geographic boundary. The same principle can be applied to modes of other devices, such as turning on a security system, turning off an oven, and the like if the user leaves their house.

Although a user's house is the associated with the geographic boundary 1210 of FIGS. 12A and 12B, in practice, a geographic boundary can be centered on or located at any suitable location or entity. For example, a geographic boundary can be defined based on a user's workplace, school, gym, church, family member's house, a park, and the like.

The electronic device 1230 can be configured to operate in a particular mode based on the presence or absence of the user within a geographic boundary, or based on a location of the user more generally. In some embodiments, the electronic device 1230 is located within the geographic boundary itself, but in other embodiments, the electronic device is located outside the boundary. The electronic device 1230 can be a device configured to control temperature, configure a security system, send a notification, turn on/off lights, turn on/off music, scan for tracking devices, or perform any other suitable function. Some examples of an electronic device 1230 include a thermostat, a security system, a router, appliances, lights, a garage door opener, a television or set-top box, a computer, and any other suitable device configured to operate in one or more modes. In one embodiment, the electronic device 1230 is a mobile device 102 associated with the user 1200 (e.g., a mobile device configured to provide locations in association with a tracking device identity to a tracking system 100 in response to detecting the tracking device). For instance, a mobile device 102 can be configured to stop scanning for tracking devices when the user is at home (e.g., and another device can instead scan for tracking devices). Likewise, the mobile device 102 can be configured to operate in a silent or airplane mode after a particular time of day when the user is at home.

Configuring an electronic device 1230 to operate in a particular mode based on the presence or absence of a user can include turning the device off or on, putting the device on silent, turning vibration on or off, or switching to airplane mode, changing the scanning frequency or transmission frequency or strength of the device, change the operation mode from "active" or "enabled" to "disabled", and the like. The electronic device can be configured to perform a particular function based on the presence or absence of a user. For example, a thermostat can be configured to change temperatures, a door can be unlocked, a set-top box can be configured to record a television program, an application can be launched on a computer, and the like. A device can be configured to operate in different modes based on the presence or absence of the user during particular times of the day. For example, a user may only want a coffee maker to make coffee if she goes to her office in the morning and may want the coffee maker to remain idle if she goes in late to work.

In some embodiments, the electronic device 1230 is a scanning device. A scanning device is a device configured to scan for tracking devices 106 in order to determine if a tracking device is within a proximity of the scanning device. Examples of scanning devices include computers, smartphones and other mobile devices, set-top boxes, and routers. A scanning device may also be a scanning hub or other specialty device built into a work station, home, or car. In embodiments in which a different scanning device is present (e.g., within a threshold proximity of a user), the scanning functionality of the user's smartphone can be disabled since the scanning device can perform the function of detecting tracking devices. Such a configuration beneficially saves mobile device battery power, since the mobile device is no longer required to scan for the tracking device.

The tracking system 100 can configure a scanning device to operate in a first mode when the user 1200 is inside the geographic boundary and a second mode when the user 1200 is outside the geographic boundary. Configuring the scanning device can include changing the scanning frequency or duty cycle of the scanning device and enabling or disabling scanning functionality of the scanning device altogether. For instance, when a user is away from home, a scanning device can be configured to scan for tracking devices every 10 seconds, and when the user is at home, the scanning device can be configured to scan for tracking devices every 1 second while a smartphone can simultaneously be configured to halt scanning for tracking devices.

Figure 13:
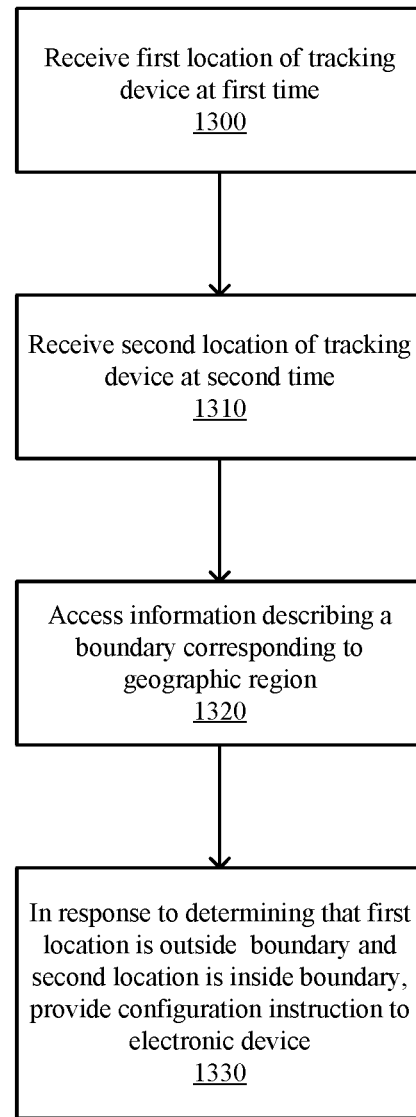
FIG. 13 illustrates a flowchart for a method of configuring an electronic device based on a location of a user.

FIG. 13 illustrates a flowchart for a method of configuring an electronic device based on a location of a user. A tracking system 100 receives 1300 a first location of a tracking device 106 from a mobile device 102 of a user at a first time. The mobile device 102 is configured to provide locations of the tracking device 106 to the central tracking device system in response to receiving communications from the tracking device 106. The tracking system 100 then receives 1310 a second location of the tracking device 106 at a second time after the first time.

The tracking system 100 accesses 1320 information describing a boundary associated with the user and corresponding to a geographic region. The user may define the location and contours of the geographic boundary for storage by the tracking system 100. In response to determining that the first location is outside the boundary and the second location is inside the boundary, the tracking system 100 provides 1330 configuration instructions to an electronic device associated with the user. The configuration instructions can identify an operating mode that the electronic device can configure itself into or the function that the electronic device is supposed to perform. In response to the receiving the configuration instructions, the electronic device can configure itself to operate in the identified operating mode. In another embodiment, the configuration instructions can be provided to the electronic device in response to determining that the tracking device is within the geographic boundary at the first time and then later is outside the geographic boundary at the second time.

Examples

In some embodiments, the tracking system 100 can send notifications to a first user based on a location of a second user. For example, the tracking system 100 may notify a user when their child gets to school, if their child gets to school on time, if their child does not arrive at school, when their child arrives home, and if their child does not arrive home based on the presence or absence of the child within a geographic boundary at a predetermined time. Additionally, the tracking system 100 may notify a user if a tracking device 106 leaves the geographic boundary unexpectedly, for instance a tracking device carried by a child leaving a boundary associated with school during school hours.

In another example, when a user crosses a geographic boundary around their house, such that the user moves into the geographic boundary, the thermostat may turn on the heater or the air conditioner, the security system may be disabled, or the oven may turn on. Other examples include opening/closing the garage door, turning on/off lights in the house, turning on/off sprinklers, turning on/off outdoor lights, or locking/unlocking the door. In the case where a user crosses the geographic boundary, such that the user moves outside the geographic boundary, the thermostat may turn off the heater or air conditioner, the security system may be enabled, the outlets in the house may be disabled (i.e., to turn off any heating devices, like a hair straightener), the dog door may be locked/unlocked, or the oven may turn off.

In a different example, when a user crosses a geographic boundary around their workplace or place of employment, the parking garage door may open, the elevator may move to the entrance level, or the user's computer monitors may turn on. Other examples include turning on/off the heater or air conditioner, turning on/off the lights in the office, or locking/unlocking the workplace door. In another example, when a user crosses a geographic boundary around their school, the attendance system may check the user in or the user's locker may unlock/lock.

In other examples, the presence or absence of a user within a geographic boundary can configure a television or set-top box to record a certain television program or movie, can configure a pet food dispensing device to dispense pet food, can activate security cameras, or can turn off power switches/outlets.

Figure 14:
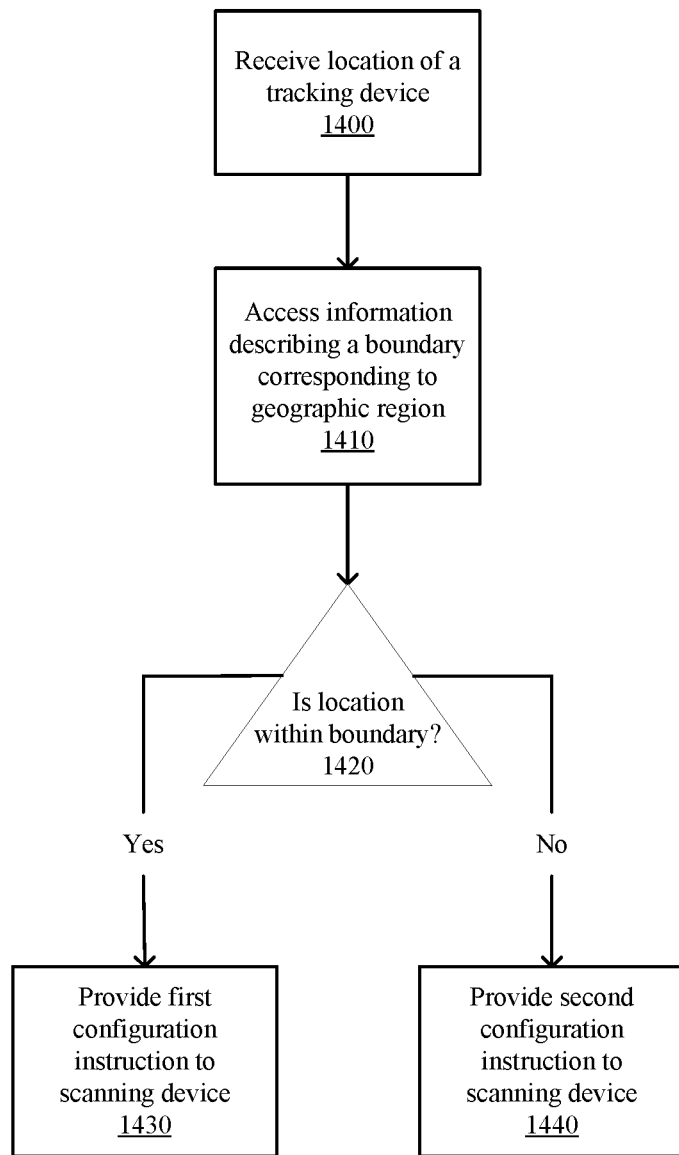
FIG. 14 illustrates a flowchart for a method of configuring a scanning device based on a location of a user.

FIG. 14 illustrates a flowchart for a method of configuring a scanning device based on a location of a user. A tracking system 100 receives 1400 a location of a tracking device 106 associated with a user. The mobile device 102 is configured to provide locations of the tracking device 106 to the tracking system 100 in response to receiving communications from the tracking device 106. The tracking system 100 accesses 1410 information describing a boundary corresponding to a geographic region, which, as noted above, may be defined by the user and stored by the tracking system.

The tracking system 100 then determines 1420 if the location of the tracking device 106 is within the geographic boundary. If the device is within the boundary, the tracking system 100 provides 1430 a first configuration instruction to the scanning device associated with the user. If the device is not within the boundary, the tracking system 100 provides 1440 a second configuration instruction to the scanning device. For instance, if the user is within the boundary, the first configuration instruction can configure the scanning device to scan at a first frequency, and if the user is outside the boundary, the second configuration instruction can configure the scanning device to scan at a second frequency less than the first frequency. In some embodiments, the first instruction can configure the scanning device to operate in a scanning mode, and the second instruction can configure the scanning device to cease scanning altogether.

Examples

In some embodiments, the tracking system 100 can be used to configure a scanning device related to a user. The scanning device may scan for tracking devices within a user's house, work, car, or other places associated with the user. In some embodiments, the scanning device takes over scanning for tracking devices from the user's mobile device when the mobile device is within a threshold proximity of the scanning device. For example, when the user enters the geographic boundary associated with the scanning device, the tracking system 100 configures the scanning device to scan for tracking devices and configures the mobile device to stop scanning for tracking devices to help save mobile device battery power. The scanning frequency, duty cycle, and scanning power/strength of the scanning device can be set by the tracking system 100 based on a user's presence or absence. For example, when a user comes home, the scanning device can be configured to scan every 15 minutes at a lower scanning power, and if the user leaves home, the scanning device can be configured to scan every 2 minutes at a high scanning power.

In some embodiments, the scanning device can be configured to scan for particular behaviors based on the presence or absence of a user. For instance, if a user is not at home, the tracking system 100 can configure the scanning device to detect any movement of an object coupled to a tracking device. If an object moves when no one is at home, the scanning device can inform the tracking system, which in turn can inform the user that the user's house has potentially been broken into and burglarized. Likewise, when the user returns home, the user is likely to interact with (and thus move) objects coupled to tracking devices, and thus the tracking system can configure the scanning device to ignore detected object movement unless an object moves more than a threshold distance away from the home.

Access Point Functionality in a Tracking Device Environment

The tracking system 100 can make use of access points within an environment to identify the locations of tracking devices. The environment is bounded by a geographic boundary, such as a geofence, that may coincide with the range of the access points within the environment. Access points, such as Wi-Fi routers and range extenders, can communicate, over a network, with tracking devices as well as a tracking server of the tracking system 100. An access point may couple with tracking devices, wherein the access point detects and/or couples to the tracking device over Bluetooth. An access point may also receive signals output by the tracking device, also via Bluetooth, while not being detected and/or coupled to the tracking device. In some embodiments, the access point may not couple to the tracking device, but rather simply detect the tracking device by receiving signals transmitted by the tracking device. Access points usually remain stationary in an environment, thereby facilitating the automated, immediate identification of tracking devices' locations. The tracking server may notify users of the tracking devices in real-time of their tracking devices' locations.

Access point functionality in a tracking device environment may be used to alert a user of a tracking device's immediate location. A number of access points may try to communicate with the tracking device, increasing the likelihood of determining the tracking device's location. In addition, when a user enters and exits a geographic boundary associated with a location, access points may report the arrival and departure of the tracking device to the tracking server. Thus, due to the presence and prevalence of access points, the tracking server can immediately determine the location of the tracking device.

Figure 15A:
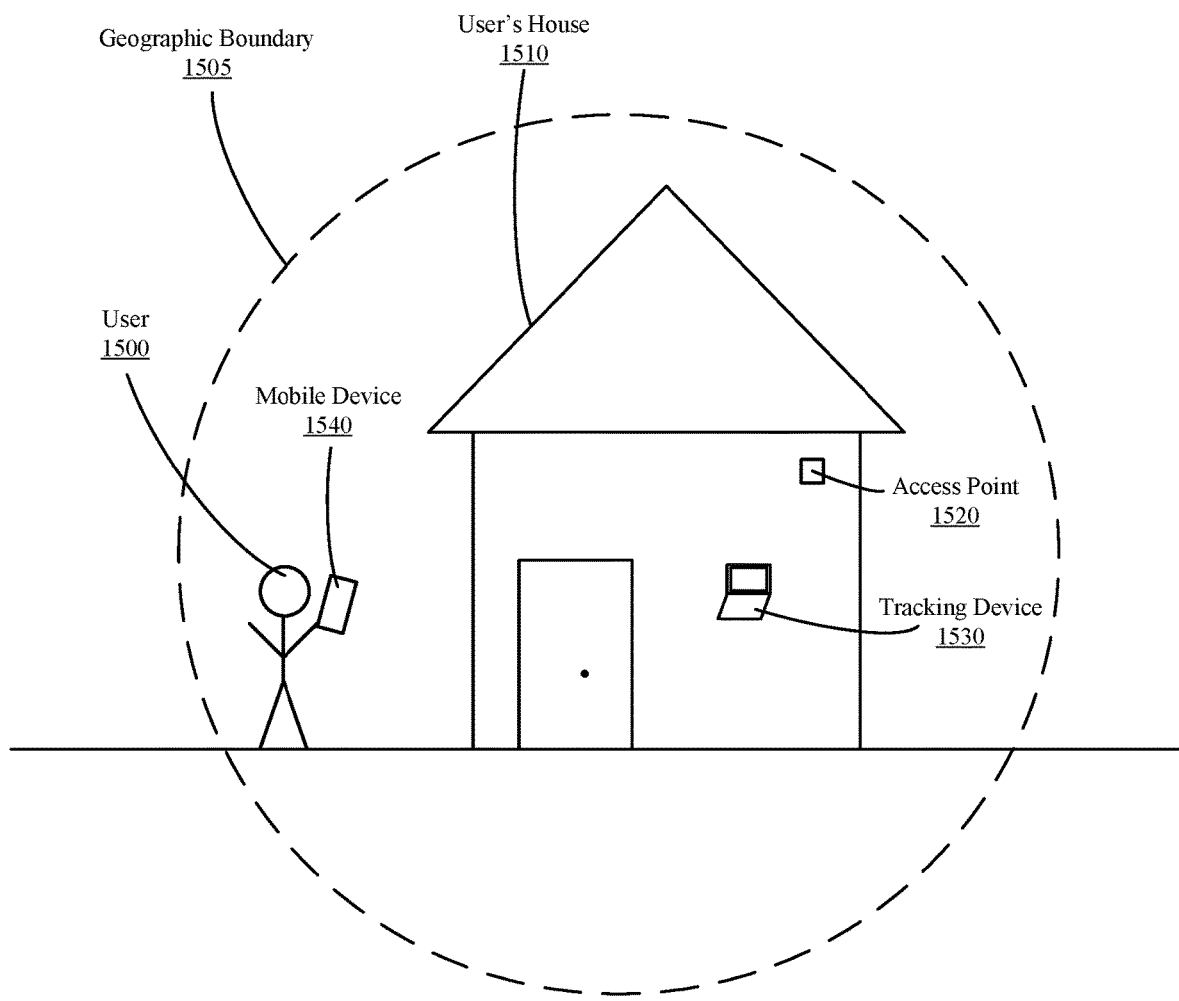
FIGS. 15A and 15B illustrate an example of a tracking device left at a location defined by a geographic boundary.
Figure 15B:
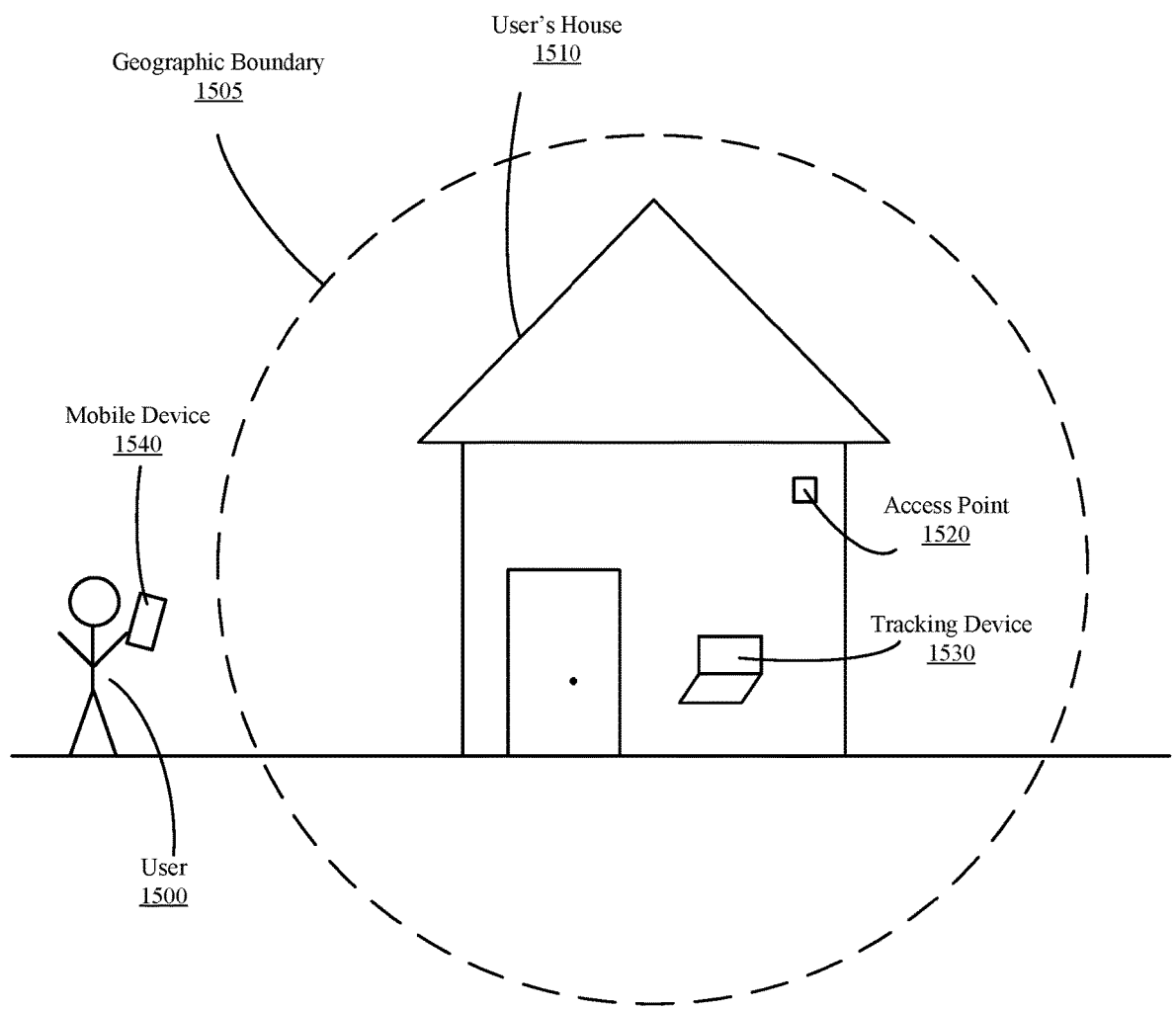

FIGS. 15A and 15B illustrate an example of a tracking device left at a location defined by a geographic boundary. Both FIGS. 15A and 15B show a user 1500 and a geographic boundary 1505 associated with a location, i.e., a house 1510 of the user 1500. The user's house 1510, an access point 1520, and a tracking device 1530 are located within the geographic boundary 1505. FIGS. 15A and 15B also show a mobile device 1540 of the user 1500.

The geographic boundary 1505 may be a geofence, as defined by a communicative range of at least one access point. The geographic boundary may also coincide with the communicative range of the mobile device 1540 and/or the tracking device. For example, in FIGS. 15A and 15B, the access point 1520 and the tracking device 1530 may each have a communicative range extending up to the geographic boundary 1505.

The access point 1520 may be a router or a similar device configured to communicate with and couple to the transceiver of the tracking device over Bluetooth. The location associated with the geographic boundary may be a place the user 1500 frequently visits, such as the user's house 1510, or a workplace of the user, or a school of the user. Each time a user is at the frequently visited location, the tracking device 1530 couples to the access point 1520. In some embodiments, the tracking device 1530 does not couple to the access point 1520. Rather, the tracking device 1530 may transmit signals over Bluetooth that are detected and stored by the access point 1520. A tracking server of the tracking system 100 is notified of the tracking device 1530's proximity to the access point 1520, wherein proximity is determined by coupling to and/or detecting the tracking device.

It should be noted that FIGS. 15A-15B show one access point and one tracking device. In reality, a location within a geographic boundary may include a plurality of access points and a plurality of tracking devices.

In FIG. 15A, the user 1500 and the mobile device 1540 are within the geographic boundary 1505. The mobile device 1540 detects and/or couples to the tracking device 1530 via Bluetooth, while the tracking device 1530 also detects and/or couples to the access point 1520.

In FIG. 15B, the user 1500 exits the geographic boundary 1505 with the mobile device 1540. The user 1500 leaves the tracking device 1530 within the geographic boundary 1505, i.e., within the user's house 1510. For example, the user 1500 may go for a run, taking the mobile device 1540 with them. The tracking device 1530, left at the user's house 1510, may be attached to a pair of keys.

The mobile device 1540 no longer couples, via Bluetooth, to the tracking device 1530, as the mobile device 1540 is beyond the communicative range of the tracking device 1530. The mobile device 1540 determines that it is no longer coupled to the tracking device 1520 and subsequently notifies the tracking server of the tracking system 100. The mobile device 1540 may wait until a threshold amount of time passes to receive a signal from the tracking device 1530. After the threshold amount of time passes, the mobile device 1540 may determine that the mobile device is not coupled to the tracking device. In some embodiments, the mobile device 1540 may determine that the mobile device is not coupled to the tracking device 1530 by detecting that a strength of the signal from the tracking device 1530 is below a threshold value. The mobile device 1540 provides the tracking server with information about the mobile device 1540's location (e.g., via GPS coordinates). The tracking server determines access points in proximity to the mobile device 1540's location, including the access point 1520. The tracking server queries one or more nearby access points, including the access point 1520, to determine whether at least one of the queried access points is communicatively coupled to the tracking device 1530. Querying nearby access points may include directly checking an access point for any coupled tracking devices and/or checking a tracking server for updates previously provided by an access point to the tracking server identifying recently coupled tracking devices. The access points may provide updates identifying recently detected and/or coupled tracking devices to the tracking server. The tracking server may receive these updates at a regular interval, such as every 2 minutes.

Since the user 1500 left the tracking device 1530 within the geographic boundary 1505, the tracking device 1530 remains communicatively coupled to the access point 1520. The tracking server determines that the tracking device 1530 is coupled to the access point 1520, and notifies the mobile device 1540 of the tracking device 1530's location.

In another embodiment, instead of receiving location data from the mobile device 1540, the tracking server may query access points that the tracking device 1530 regularly couples to. Regularly coupled and/or detected access points may comprise access points at the user's house 1510, including the access point 1520, access points at the user's workplace, school, or gym. In some embodiments, the tracking server may identify recently provided updates from one or more access points 1520 that detected and/or coupled to the tracking device 1530. If the tracking server has received an update from an access point 1520 within a previous threshold interval of time (e.g., within the last 5 seconds, within the last 10 seconds, etc.), the tracking server can determine that the tracking device 1530 is located within a threshold distance of the access point and can inform the mobile device 1540 accordingly.

Once the tracking server notifies the mobile device 1540 of the tracking device 1530's location, the mobile device 1540 may display a notification to the user 1500 informing them that the tracking device 1530 was left within the geographic boundary 1505, at the user's house 1510. In another embodiment, the mobile device 1540 does not notify the user 1500 of the tracking device 1530's location, particularly if the location is regularly visited by the user, such as the user's house 1510.

The user 1500 may choose whether to be notified, via the mobile device 1540, about instances in which the tracking device 1530 is left at a location. In some embodiments, the user 1500 may receive an initial notification, via the mobile device 1540, indicating that the tracking device 1530 is left at the location. The user 1500 may provide an input to the mobile device 1540 choosing to prevent the subsequent display of notifications. This may be useful when the user 1500 wants to specify whether to be notified about certain tracking devices at certain locations. In line with the example above, when going on the run, the user 1500 may choose to not receive notifications when the tracking device 1530, connected to the user 1500's keys, is left within the geographic boundary 1505 corresponding to the user's house 1510. However, the user 1500 may choose to receive notifications when another tracking device, such as one coupled to a laptop, is left within a geographic boundary corresponding to the user's workplace.

In one embodiment, when notified that the tracking device 1530 is not communicatively coupled to the mobile device 1540, the tracking server may determine that the tracking device 1530 is also not communicatively coupled with any queried access points. The tracking server may notify the mobile device 1540 and the mobile device 1540 may subsequently notify the user 1500 that the tracking device 1530 is lost. Following the above example, if the user 1500 took their keys with them on the run, but dropped them, the tracking device 1530 associated with the keys would no longer be detected by and/or coupled with the mobile device 1540. The tracking device 1530 would no longer be in the communicative range of the mobile device 1540. The tracking server would determine that the tracking device 1530 is not coupled to the access point 1520 or any other nearby access points, thus determining that the tracking device 1530 is not within the geographic boundary 1505. The tracking server informs the mobile device 1540, which immediately notifies the user 1500 that the keys are lost.

In some embodiments, access points at particular locations (such as within a user's home) can be used to decrease the amount of time required to determine that a tracking device has been left behind as a user leaves a location. A user's mobile device can scan for a tracking device as the user leaves the location, and makes a determination that the tracking device has been left behind if no signals from the tracking device are received within a threshold amount of time (such as 2-4 minutes). However, waiting this amount of time can result in the user moving further away from the location, increasing the amount of time it takes for the user to return to the location to retrieve the tracking device. Using an access point located at the location can decrease this time interval, thereby decreasing the amount of time required to notify the user that the tracking device has been left behind.

Figure 16:
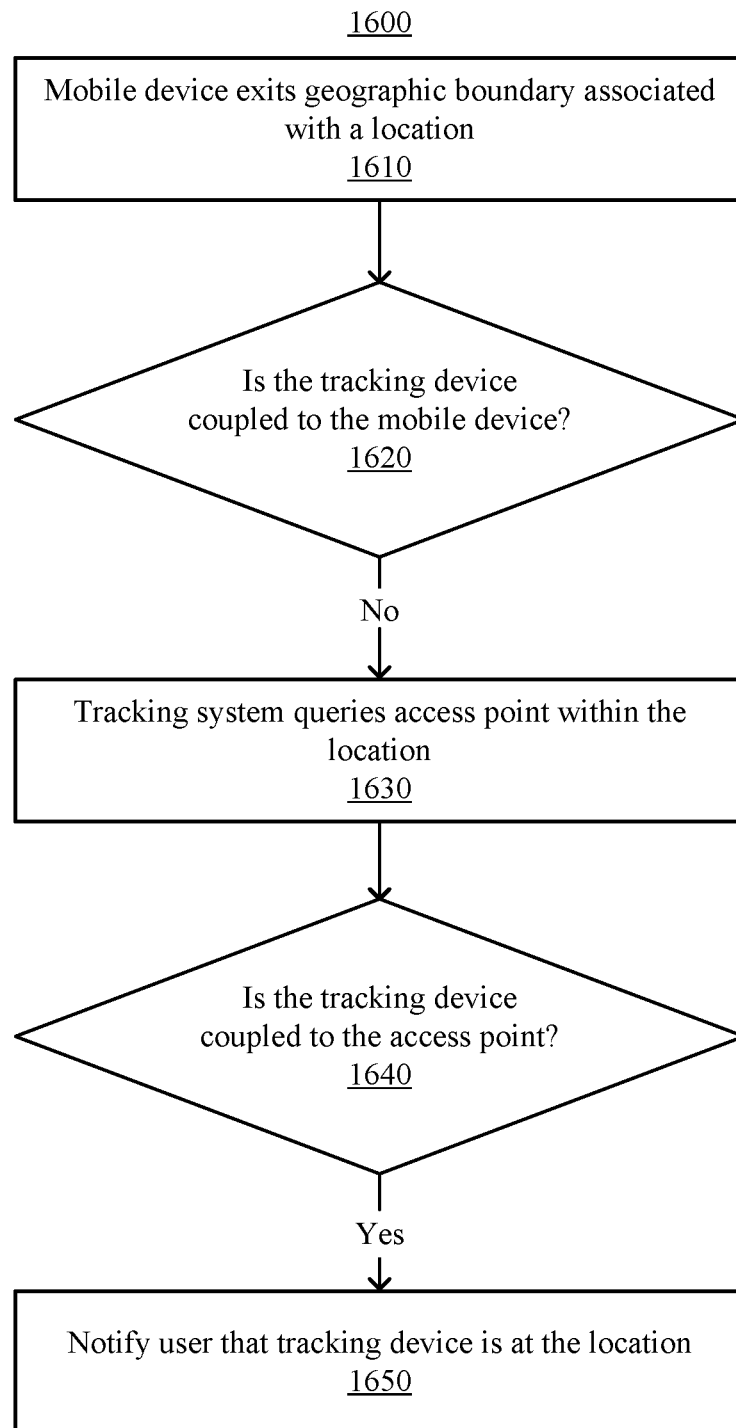
FIG. 16 illustrates a flowchart for a method of determining that a tracking device is located at a location that includes an access point.

FIG. 16 illustrates a flowchart for a method 1600 of determining that a tracking device is located at a location that includes an access point.

A mobile device (e.g., the mobile device 1540) exits 1610 a geographic boundary (e.g., the geographic boundary 1505) associated with a location (e.g., the user's house 1510). The location includes at least one access point (e.g., the access point 1520).

The mobile device determines 1620 whether it is communicatively coupled, for instance via Bluetooth, to a tracking device (e.g., the tracking device 1530). After determining that the mobile device is not communicatively coupled to the tracking device, the mobile device requests that a tracking system (e.g., the tracking system 100) query the access point without waiting for the threshold period of time that might otherwise be required for the mobile device to determine that the tracking device is within range of the mobile device.

A tracking server of the tracking system queries 1630 an access point within the location to determine if the tracking device is communicatively coupled to the access point. The access point may be a wireless access point or a Wi-Fi access point, such as a router, modem, range extender, or a television set-top box.

In response to determining 1640 by the tracking server that the access point is communicatively coupled to the tracking device, the tracking server can determine that the tracking device is located at the location associated with the geographic boundary, and thus is not within range of the mobile device. The tracking server informs the mobile device of the tracking device's location.

The mobile device notifies 1650 the user that the tracking device is not within range of the user and/or is at the location, for instance via a notification displayed by the mobile device. In some embodiments, the mobile device may not notify the user of the tracking device's location, for instance if the location corresponds to a pre-determined safe zone, or if the user has historically left the tracking device at the location (for instance within a particular time range).

Figure 17:
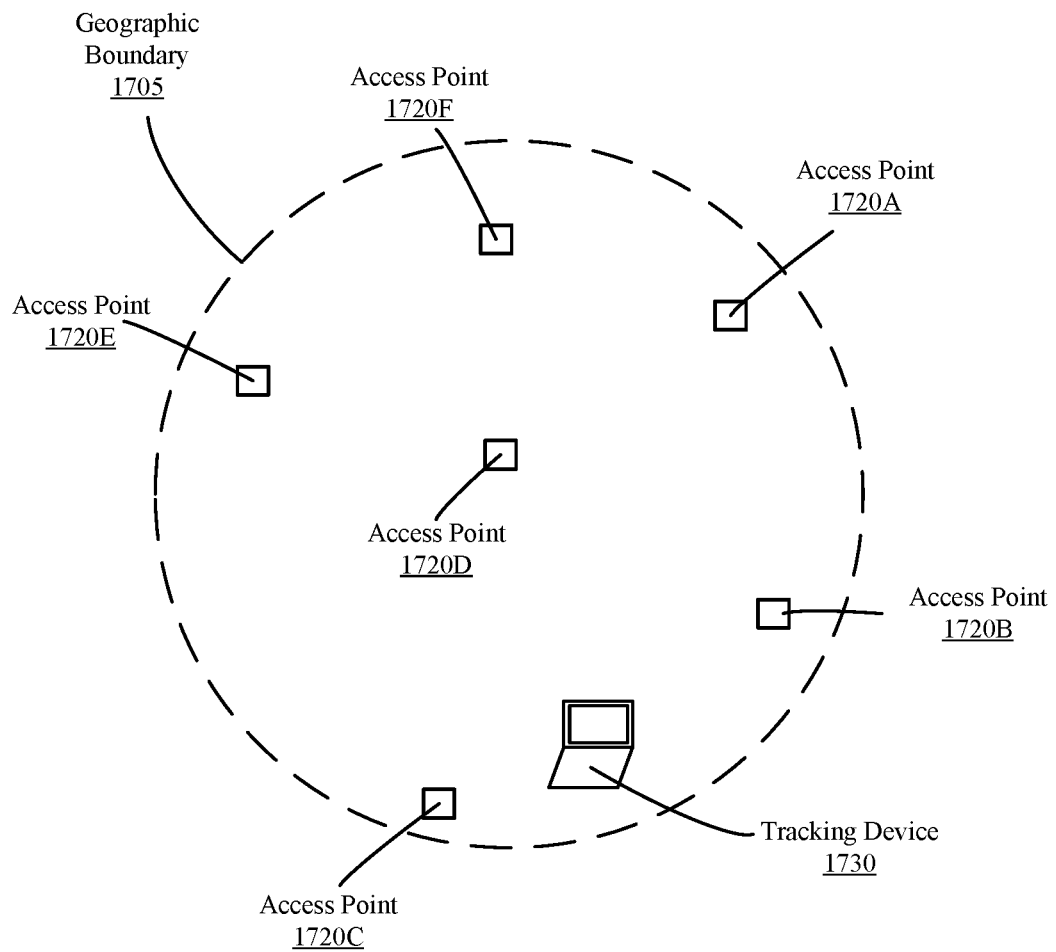
FIG. 17 illustrates an example of a set of access points within a geographic boundary.

FIG. 17 illustrates an example of a set of access points within a geographic boundary. A geographic boundary 1705 encloses a number of access points 1720A-F, designated as the set of access points 1720, and a tracking device 1730. The geographic boundary may correspond to a geofence surrounding a user's house or an airport, for example, and may coincide with the limits of the access points' communicative range. As noted above, a location associated with a geographic boundary may have a plurality of access points.

A tracking server of the tracking system 100 may associate the access points 1720A-F with the location corresponding to the geographic boundary 1705. Each access point 1720A-F is configured to detect the tracking device 1730 within a certain range of the access point. In the example of FIG. 17, at least one of the access points 1720B-D may detect tracking device 1730, since the tracking device 1730 is within a threshold distance of the access points 1720B-D (not shown in FIG. 17). The access points 1720A and 1720E-F, located farther away from the tracking device 1730, may detect the tracking device 1730 as well, but with a lower likelihood than the access points 1720B-D.

After the tracking device 1730 has moved out of range of the access points 1720A-F, the access points may be unable to detect the tracking device 1730 over an interval of time. The tracking server, after going a threshold amount of time without receiving a location of the tracking device 1730 from the set of access points 1720, can determine that the tracking device 1730 is not in the location associated with the set of access points. The tracking server can provide a notification, for instance to a mobile device of the user, indicating that the tracking device 1730 is not at the location. The mobile device may also notify the user the tracking device 1730 is lost, for instance if the user is located at the location and the tracking device moves from within the location to outside of the location.

In the case that at least one access point detects the tracking device over the interval of time, the access point notifies the tracking server of the location of the tracking device. The tracking server determines that the tracking device is located at the location and generates an instruction to provide to the tracking device 1730, such as an instruction to ring the tracking device or to couple to a nearby access point 1720C. The tracking server sends the identified instruction to the set of access points 1720A-F, each of which is instructed or configured to send the instruction to the tracking device 1730. With all of the access points 1720A-F in the set of access points providing the instruction to the tracking device 1730, there is a greater likelihood that the tracking device 1730 receives the instruction from at least one of the access points 1720A-F.

For example, in one embodiment, the access points 1720A-F are all located within a geographic boundary 1705 that is associated with a convention center. The tracking device 1730 may be attached to a laptop of the user, which the user may unintentionally leave in a room in proximity to the access points 1720B-C. The access points 1720B-C may detect the tracking device 1730 for an interval of time, and inform the tracking server when the access points detect the tracking device. In response, the tracking server determines that the tracking device 1730 is located at the convention center, and notifies the user. The user may in turn request that the tracking server provide an instruction to ring the tracking device, and the tracking device can provide the instruction to all of the access points 1720B-C. Accordingly, the likelihood that the tracking device will receive the instruction, and thus ring, increases, beneficially enabling the user to more easily identify the location of the laptop.

While the tracking server provides the identified instruction to all of the access points 1720A-F, each of which in turn is configured to transmit the instruction to the tracking device 1730, in practice, the tracking device 1730 may receive the instruction only from the access points closest to it, such as the access points 1720B-D. In some embodiments, when the tracking device 1730 receives the same instruction from multiple access points, the tracking device only performs the instruction once.

In addition to ringing, the tracking server can provide other instructions to the set of access points 1720 to provide to the tracking device. For instance, the tracking server can instruct the tracking device 1730 to communicatively couple to the user's mobile device if it is within the communicative range of the tracking device 1730, to configure the tracking device into a different operating mode (such as a lost mode or an increased transmission power mode), or to disable one or more features of the tracking device (or a device to or within which the tracking device is located or implemented).

In some embodiments, the tracking server can notify the user (via the mobile device) to the areas within the geographic boundary 1705 in which access points nearest the tracking device are located. For instance, if one or more access points are coupled to the tracking device, or if the tracking device receives an instruction from one or more access points, the tracking server can identify a location of the access points, for instance within the geographic boundary. In some embodiments, the tracking server can indicate a location and/or communicative range of the access points within range of the tracking device within a map interface, beneficially enabling the user to retrieve the tracking device more easily.

Figure 18:
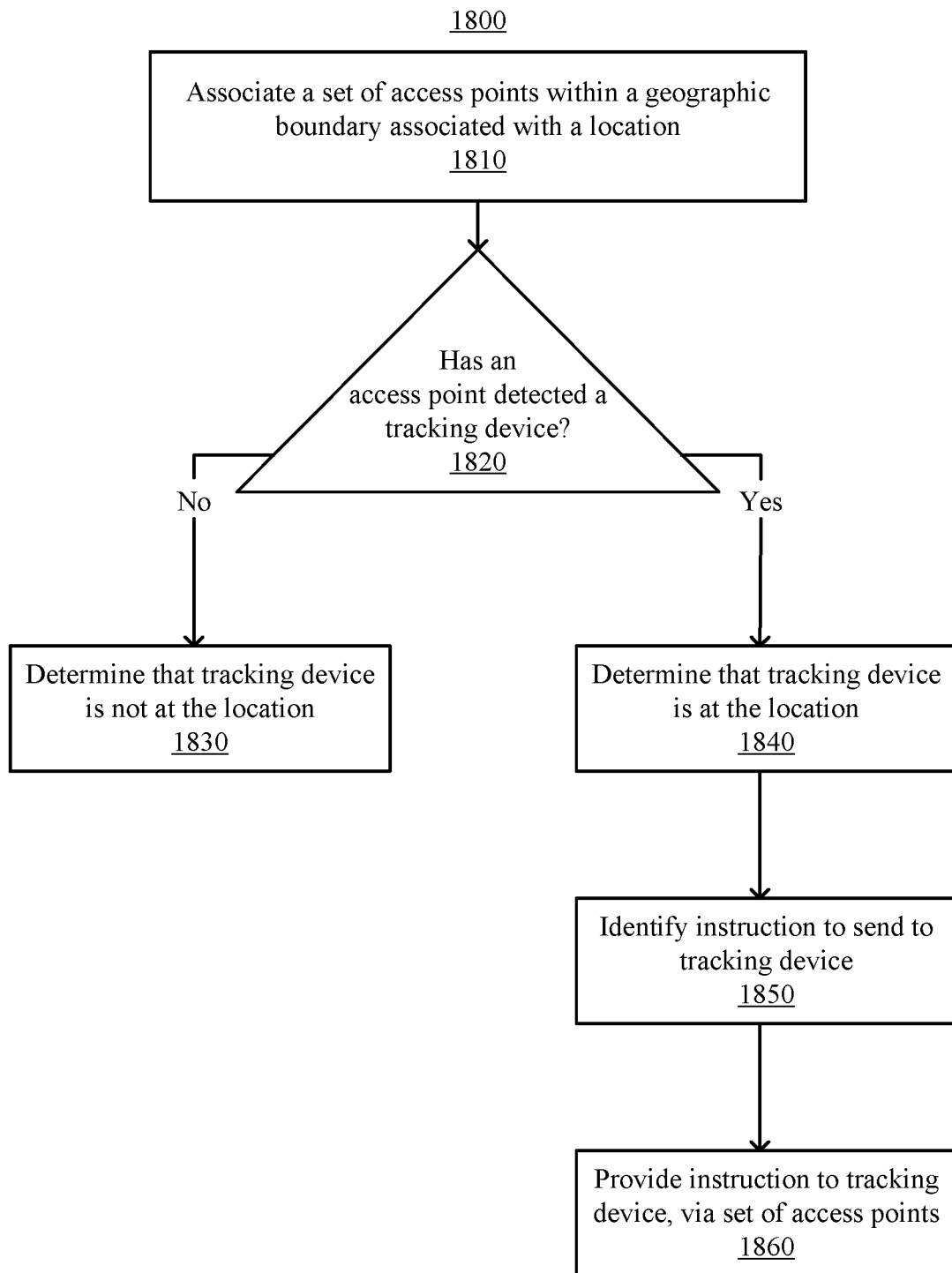
FIG. 18 illustrates a flowchart for a method of locating a tracking device using a set of access points.

FIG. 18 illustrates a flowchart for a method 1800 of locating a tracking device using a set of access points.

A tracking server of the tracking system 100 associates 1810 a plurality of access points (e.g., the access points 1720A-F) as a pre-determined set of access points. Each access point is located within a geographic boundary (e.g., the geographic boundary 1705) that is associated with a location. Examples of locations include a user of the tracking device's house, workplace, a conference center, and a school, among others. Each access point is configured to detect tracking devices (e.g., the tracking device 1730) located within a proximity of the access point. For example, the access point may be able to detect tracking devices located within a communicative range of the access point.

The tracking server determines 1820 whether at least one of the access points in the set of access points detects the tracking device within an interval of time.

If none of the access points detect the tracking device over the interval of time, the tracking server determines 1830 that the tracking device is not at the location (or at least is not located within areas of the location within range of the set of access points).

If at least one of the access points in the set of access points detects the tracking device within the interval of time, the tracking server determines 1840 that the tracking device is at the location.

The tracking server identifies 1850 an instruction to send to the tracking device. The instruction may assist the user in locating the tracking device, relative to the locations of access points within the geographic boundary. For example, the instruction may instruct the tracking device to ring or to transmit beacon signals at a higher transmission power. In some embodiments, the instruction may instruct the tracking device to vibrate or emit a light.

The tracking server provides 1860 the identified instruction to each access point in the set of access points. Each access point is in turn configured to transmit the instruction to the tracking device, increasing the likelihood that the tracking device receives the instruction from at least one access point, and thus increasing the likelihood that the tracking device executes the instruction. The tracking device may not receive the instruction from access points farther away from the tracking device, but may receive the instruction from those access points in proximity to the tracking device.

Figure 19:
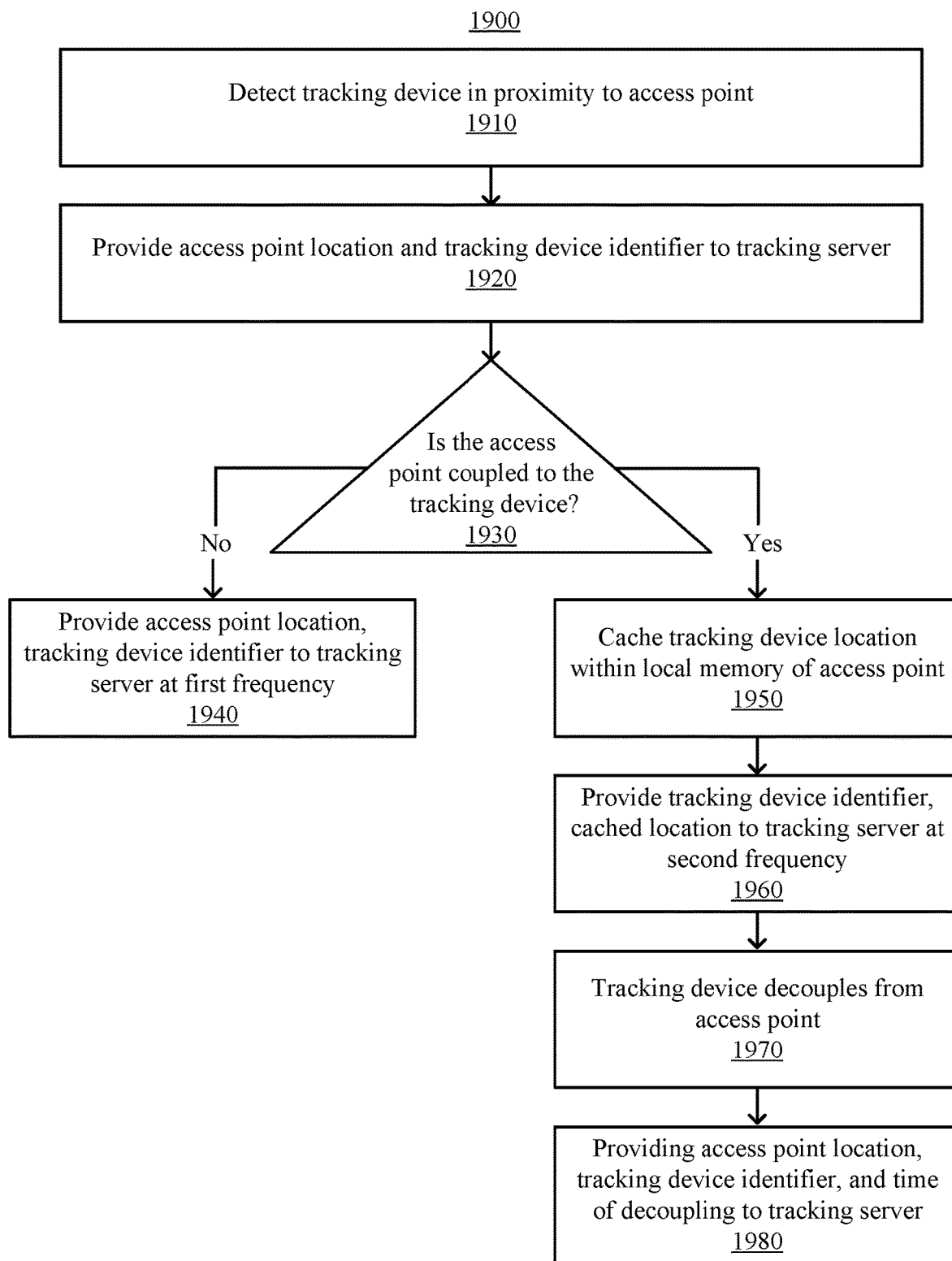
FIG. 19 illustrates a flowchart for a method of reporting a location of a tracking device.

FIG. 19 illustrates a flowchart for a method 1900 of reporting a location of a tracking device. An access point may detect signals transmitted by a tracking device in proximity to the access point. Once the tracking device has been detected, the access point reports the tracking device's presence to a tracking server of the tracking system 100 at a default transmission frequency (or "first frequency"). The tracking device may remain coupled to the access point over an interval of time, during which the access point repeatedly notifies the tracking server of the tracking device's presence. Instead of repeatedly providing the same information at the same first frequency, the access point may instead cache the tracking device's presence within the range of the access point in memory, and can either notify the tracking server of the tracking device's presence at a second, lower frequency, or can simply report the tracking device's arrival to (or coupling to) and departure from (or decoupling from) the access point's communicative range. By limiting the amount of redundant location information reported by the access point, the amount of transmission bandwidth and memory storage required by the tracking server can beneficially be reduced.

An access point first detects 1910 a tracking device in proximity to the access point. The first detection of the tracking device's presence by the access point indicates that the tracking device has moved within the communicative range of the access point. The access point may be part of a set of access points, the collective range of which may constitute a geographic boundary, such as the geographic boundary 1705. In some embodiments, the first detection of the tracking device by the access point indicates that the tracking device entered the geographic boundary corresponding to a set of access points.

In response to detecting the tracking device, the access point provides 1920 the location of the access point (or a location corresponding to the geographic boundary) and the unique identifier of the tracking device to the tracking server.

The access point determines 1930 whether it is coupled to the tracking device, for instance by determining if the access point is paired with the tracking device via Bluetooth. In some embodiments, the access point may not couple to the tracking device, but rather may simply detect the tracking device by receiving signals transmitted by the tracking device.

After detecting the tracking device, but determining that the access point is not communicatively coupled to the tracking device, the access point provides 1940 its own location and the tracking device identifier to the tracking server at a first frequency, such as every minute. The first frequency may be operating default transmission frequency. In some embodiments, the access point provides the location of the tracking device to the tracking server if the access point detects the tracking device within a time period between transmissions at the first frequency.

After detecting the tracking device, but determining that the access point is communicatively coupled to the tracking device, the access point can cache 1950 the tracking device's presence within the access point's local memory. Accordingly, the tracking server may determine the tracking device's location, which is associated with the access point's location, provided that the access point is stationary.

While the access point remains coupled to the tracking device, the access point can subsequently provide 1960 the tracking device identifier and cached location to the tracking server at a second frequency. The second frequency may be slower than the first frequency and/or the default transmission frequency. For example, the access point may provide the tracking server with updates every three minutes, rather than every minute. The tracking server can also determine the frequency at which the access point provides updates while the access point is coupled to the tracking device. In some embodiments, while the tracking device remains communicatively coupled to the access point, the access point does not provide the tracking server with any location updates.

In addition to reporting the tracking device's location at a reduced frequency, the access point reports the decoupling of the access point of the tracking device and the access point (or the departure of the tracking device from the access point's range). In response to the tracking device decoupling from the access point, the access point provides 1980 the location of the access point, the tracking device identifier, and the time of the tracking device's decoupling from the access point to the tracking server. In some embodiments, the tracking device decouples from the access point because the tracking device departs from the geographic boundary or from the collective communicative range of the set of access points, indicating that the tracking device is no longer in any access point's range at that location. The tracking server may notify the user's mobile device of the tracking device's departure from the location.

Continuing with the previous example, the access points are within the geographic boundary are associated with a convention center, and the user unintentionally leaves the tracking device associated with a laptop near an access point. The laptop and the associated tracking device may be stolen. The access points may detect that the tracking device exited the geographic boundary and can provide a notification to the tracking server. The tracking server may notify the user's mobile device, which subsequently displays a notification to the user. The user may still be in the convention center and upon receiving the notification, may immediately realize that the laptop is stolen. The notification to the user may also include the location of the access point that detected the departure of the tracking device, such that the user can pursue the laptop thief as soon as possible.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for locating a tracking device, comprising:
    detecting, by an access point, a tracking device within a proximity of the access point;
    while the tracking device and the access point are communicatively coupled, providing, by the access point, a location of the access point and an identifier of the tracking device to a tracking server at a first frequency; and
    while the tracking device and the access point are not communicatively coupled, providing, by the access point, a location of the access point and an identifier of the tracking device to the tracking server at a second frequency greater than the first frequency.

2. The method of claim 1, wherein the tracking device and the access point being communicatively comprises being paired via Bluetooth.

3. The method of claim 1, wherein the access point is associated with a geographic boundary.

4. The method of claim 3, wherein the access point, in response the tracking device moving outside of the geographic boundary, is configured to provide the identifier of the tracking device and a time at which the tracking device moved outside of the geographic boundary.

5. The method of claim 4, wherein the tracking server is configured to provide a notification for display by a client device of a user indicating that the tracking device has moved outside of the geographic boundary.

6. The method of claim 1, wherein one or both of the first frequency and the second frequency are selected by the user.

7. The method of claim 1, wherein the access point is a router.

8. An access point for locating a tracking device, comprising:
- a hardware processor; and
- a non-transitory computer-readable storage medium storing executable instructions that, when executed by the hardware processor, cause the hardware processor to perform steps comprising:
  - detecting, by the access point, a tracking device within a proximity of the access point;
  - while the tracking device and the access point are communicatively coupled, providing, by the access point, a location of the access point and an identifier of the tracking device to a tracking server at a first frequency; and
  - while the tracking device and the access point are not communicatively coupled, providing, by the access point, a location of the access point and an identifier of the tracking device to the tracking server at a second frequency greater than the first frequency.

9. The system of claim 8, wherein the tracking device and the access point being communicatively comprises being paired via Bluetooth.

10. The system of claim 8, wherein the access point is associated with a geographic boundary.

11. The system of claim 10, wherein the access point, in response the tracking device moving outside of the geographic boundary, is configured to provide the identifier of the tracking device and a time at which the tracking device moved outside of the geographic boundary.

12. The system of claim 11, wherein the tracking server is configured to provide a notification for display by a client device of a user indicating that the tracking device has moved outside of the geographic boundary.

13. The system of claim 8, wherein one or both of the first frequency and the second frequency are selected by the user.

14. The system of claim 8, wherein the access point is a router.

15. A non-transitory computer-readable storage medium storing executable instructions for locating a tracking device that, when executed by a hardware processor, cause the hardware processor to perform steps comprising:
- detecting, by an access point, a tracking device within a proximity of the access point;
- while the tracking device and the access point are communicatively coupled, providing, by the access point, a location of the access point and an identifier of the tracking device to a tracking server at a first frequency; and
- while the tracking device and the access point are not communicatively coupled, providing, by the access point, a location of the access point and an identifier of the tracking device to the tracking server at a second frequency greater than the first frequency.

16. The non-transitory computer-readable storage medium of claim 15, wherein the tracking device and the access point being communicatively comprises being paired via Bluetooth.

17. The non-transitory computer-readable storage medium of claim 15, wherein the access point is associated with a geographic boundary.

18. The non-transitory computer-readable storage medium of claim 17, wherein the access point, in response the tracking device moving outside of the geographic boundary, is configured to provide the identifier of the tracking device and a time at which the tracking device moved outside of the geographic boundary.

19. The non-transitory computer-readable storage medium of claim 18, wherein the tracking server is configured to provide a notification for display by a client device of a user indicating that the tracking device has moved outside of the geographic boundary.

20. The non-transitory computer-readable storage medium of claim 15, wherein one or both of the first frequency and the second frequency are selected by the user.

\* \* \* \* \*